United States Patent
Park

(10) Patent No.: US 11,580,953 B2
(45) Date of Patent: Feb. 14, 2023

(54) METHOD FOR PROVIDING SPEECH AND INTELLIGENT COMPUTING DEVICE CONTROLLING SPEECH PROVIDING APPARATUS

(71) Applicant: LG ELECTRONICS INC., Seoul (KR)

(72) Inventor: Mihyun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 742 days.

(21) Appl. No.: 16/554,374

(22) Filed: Aug. 28, 2019

(65) Prior Publication Data
US 2019/0385588 A1 Dec. 19, 2019

(30) Foreign Application Priority Data
Jul. 18, 2019 (KR) .................. 10-2019-0087075

(51) Int. Cl.
H04W 72/04 (2009.01)
G10L 13/08 (2013.01)
G06N 3/08 (2023.01)

(52) U.S. Cl.
CPC .............. *G10L 13/08* (2013.01); *G06N 3/08* (2013.01); *H04W 72/042* (2013.01); *H04W 72/048* (2013.01)

(58) Field of Classification Search
CPC ....... G10L 13/08; G10N 3/08; H04W 72/042; H04W 72/048
See application file for complete search history.

(56) References Cited

U.S. PATENT DOCUMENTS

| 10,187,512 B2 * | 1/2019 | Singh .............. H04M 3/42391 |
| 2017/0221479 A1 * | 8/2017 | Latorre-Martinez ... G10L 15/07 |
| 2018/0176746 A1 * | 6/2018 | Kapatralla .......... H04L 65/1059 |

(Continued)

FOREIGN PATENT DOCUMENTS

| KR | 10-2018-0076197 A | 7/2018 |
| KR | 10-2019-0075017 A | 6/2019 |
| WO | WO 2018/030149 A1 | 2/2018 |

OTHER PUBLICATIONS

Arik et al., "Deep Voice 2: Multi-Speaker Neural Text-to-Speech", 31st Conference on Neural Information Processing Systems (NIPS), 2017, Long Beach, CA, USA, 9 pages.

*Primary Examiner* — Chi Ho A Lee
(74) *Attorney, Agent, or Firm* — Birch, Stewart, Kolasch & Birch, LLP

(57) ABSTRACT

A method for providing a speech and an intelligent computing device controlling a speech providing apparatus are disclosed. A method for providing a speech according to an embodiment of the present invention includes obtaining a message, converting the message into a speech, and determining output pattern based on a generation situation of the message, so that it is possible to more realistically convey a situation at a time of message generation to a receiver of TTS. One or more of the voice providing method, devices, intelligent computing devices controlling the voice providing device, and servers of the present invention may include artificial intelligence modules, drones (Unmanned Aerial Vehicles, UAVs), robots, Augmented Reality (AR) devices, and virtual reality (VR) devices, devices related to 5G services, and the like.

19 Claims, 28 Drawing Sheets

(56) References Cited

U.S. PATENT DOCUMENTS

| | | | |
|---|---|---|---|
| 2020/0117945 A1* | 4/2020 | Jeong | G06V 10/56 |
| 2020/0135158 A1* | 4/2020 | Yao | G06F 16/635 |
| 2020/0150794 A1* | 5/2020 | Han | G06F 3/044 |
| 2020/0175961 A1* | 6/2020 | Thomson | G10L 15/28 |
| 2020/0243094 A1* | 7/2020 | Thomson | H04M 3/42382 |
| 2020/0267537 A1* | 8/2020 | Oak | H04W 8/24 |
| 2020/0335125 A1* | 10/2020 | Palmer | G10L 25/51 |
| 2021/0169417 A1* | 6/2021 | Burton | A61B 5/4857 |
| 2021/0320710 A1* | 10/2021 | Koskela | H04W 24/02 |

* cited by examiner

FIG. 27
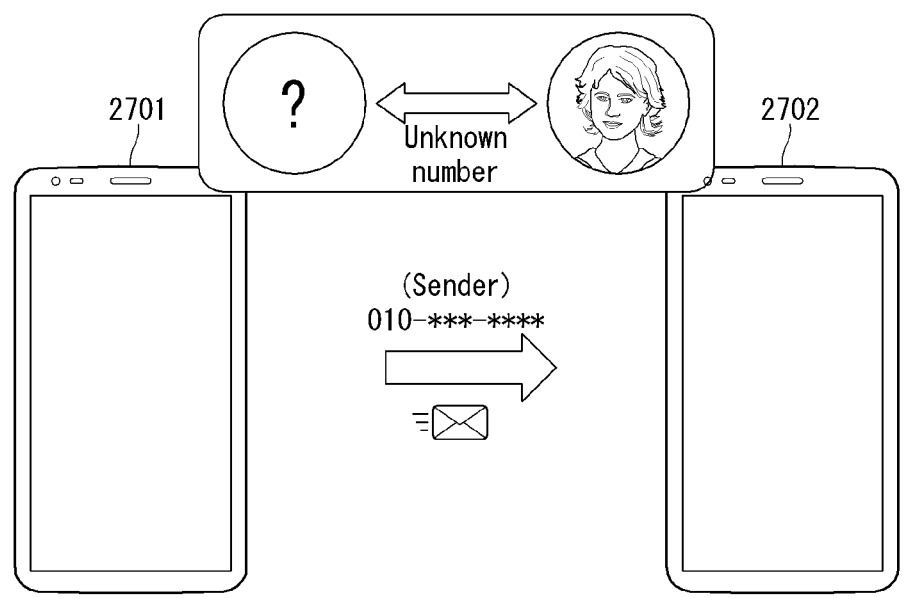
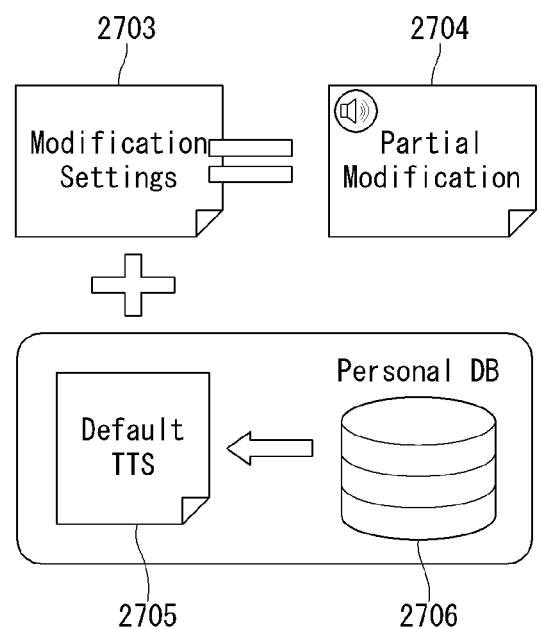

FIG. 28

| Speaker | Default | My friend Da-Hyun | LG U+ (Enterprise) | Not known 1 | Not known 2- some known |
|---|---|---|---|---|---|
| Sex | Female | Female | Female | Female | (Modification) Male |
| Age | 20 | ? | 30 | 20 | (Modification) Mid-20s |
| Nationality | Korea | Korea | Korea | Korea | Korea |
| ID | Default | My friend Da-Hyun | Remote server -LG U+ | Young-Hee | Default |

| Text emotion | Default | Texting speed fast | User writes during sleeping | Child writes with mother'sphone | Writing in situation of boarding vehicle |
|---|---|---|---|---|---|
| Utterance speed | Normal | Fast | Slow | Normal | Normal |
| Pitch of entire sentence | Normal | Normal | Low | Normal | Normal |
| Relative height in sentences | Less | Less | Less | Less | Less |
| Emotion | Normal | Urgent | Sleepy | Playful | Normal |
| | | | | +Speaker information Change | |
| The others | | | | | |
| BGM | None | None | None | None | Car engine sound |

METHOD FOR PROVIDING SPEECH AND INTELLIGENT COMPUTING DEVICE CONTROLLING SPEECH PROVIDING APPARATUS

CROSS-REFERENCE TO RELATED APPLICATION

This application claims the benefit of Korean Patent Application No. 10-2019-0087075 filed on Jul. 18, 2019, the entire disclosure of which are hereby incorporated by reference herein for all purposes.

BACKGROUND OF THE INVENTION

Field of the Invention

The present invention relates to a method for providing a speech and an intelligent computing device controlling a speech providing apparatus, and more specifically, to a method for providing a speech capable of intelligently providing a speech and an intelligent computing device controlling the speech providing apparatus by reflecting information related to a situation of a conversation included in the speech.

Description of the Related Art

Conventional text-to-speech (TTS) processing outputs text with pre-stored speech.

The primary purpose of the TTS processing is to convey the semantic contents of text.

Recently, a technique has been developed in which the TTS processing allows not only the semantic contents of text but also the interactive meaning of text to be transmitted to the other party.

However, there is a need to experience an interactive conversation with the text sender by reflecting the intention and emotion of the user who has conveyed the actual text to the speech output.

SUMMARY OF THE INVENTION

An object of the present invention is to meet the needs and solve the problems.

The present invention also aims at implementing an intelligent computing device that provides a speech based on information related to a situation of the conversation included in the speech.

The present invention also aims at implementing a computing device that intelligently provides a speech in a pattern that reflects information related to a speaker and a listener of the conversation included in the speech.

A method for providing a speech by an intelligent speech providing apparatus according to an embodiment of the present invention includes obtaining a message; converting the message into a speech; and providing the speech, wherein the converting the message into a speech includes generating output pattern information based on information related to a generation situation of the message, and converting the message into a speech based on the output pattern information.

The information related to a generation situation of the message may include information related to a creator of the message.

The information related to a generation situation of the message may include information related to a surrounding environment at a time the message is created.

The information related to a generation situation of the message may include information related to a receiver of the message.

The method may further include displaying the message on a display based on the information related to a generation situation of the message.

The displaying may include displaying a background image on a background of the message based on information related to a time at which the message is created or weather at a time at which the message is created.

The displaying may include adjusting a position of the message based on information related to an emotion of a creator at a time of creation of the message.

The displaying may include, when the message is obtained using a speech signal, adjusting a distance between a plurality of syllables included in the message based on a time-domain waveform of the speech signal.

The method may further include receiving a touch input to the displayed message, and modifying the generated output pattern information based on the touch input.

The method may further include outputting background music through an output device based on information related to a surrounding environment at a time the message is created.

The generating output pattern information may include obtaining the output pattern information as output of a pre-learned artificial neural network by inputting the message and the information related to a generation situation of the message to the artificial neural network.

The artificial neural network may be pre-learned by using information related to a plurality of speakers and call speech data between the plurality of speakers before the obtaining the message.

The generating output pattern information may further include classifying a plurality of speeches uttered by the plurality of speakers included in the message using the artificial neural network.

The method may further include receiving, from a network, downlink control information (DCI) used for scheduling transmission of the information related to a generation situation of the message obtained from at least one sensor included in the speech providing apparatus, and the information related to a generation situation of the message may be transmitted to the network based on the DCI.

The method may further include performing an initial connection procedure with the network based on a synchronization signal block (SSB), and the information related to a generation situation of the message may be transmitted to the network through a PUSCH, and the SSB and DM-RS of the PUSCH may be a QCL for QCL type D.

The method may further include controlling a communication unit to transmit the information related to a generation situation of the message to an AI processor included in the network; and controlling the communication unit to receive AI processed information from the AI processor, and the AI processed information may include the output pattern information generated based on the information related to a generation situation of the message.

An intelligent computing device controlling a speech providing apparatus, according to an embodiment of the present invention includes a communication unit configured to obtain a message; a processor; and a memory including a command executable by the processor, wherein the command is configured to obtain information related to a generation situation of the message from the message, generate output pattern information based on the information related to a generation situation of the message, and output the message to a speech based on the output pattern information.

The processor may apply a pre-stored user preference output pattern to the message, and update the output pattern applied to the message based on the information related to a generation situation of the message.

The processor may obtain the information related to a generation situation of the message by inputting the message to a pre-learned first artificial neural network, and obtain the output pattern information by inputting the information related to a generation situation of the message to a pre-learned second artificial neural network.

A recording medium according to another embodiment of the present invention, a non-transitory computer readable recording medium stored with a computer-executable component configured to execute on one or more processors of a computing device, the computer-executable component is configured to obtain a message, generate output pattern information based on information related to a generation situation of the message, convert the message into a speech based on the output pattern information, and control a speech providing apparatus characterized in providing the speech.

BRIEF DESCRIPTION OF THE DRAWINGS

FIG. 27 illustrates an example of providing a speech by deducing an output pattern from a message.

FIG. 28 illustrates an example of situation information related to a deduced message.

The accompanying drawings, included as part of the detailed description in order to provide a thorough understanding of the present invention, provide embodiments of the present invention and together with the description, describe the technical features of the present invention.

DETAILED DESCRIPTION OF THE EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of block diagram of UE and 5G network

Figure 1:
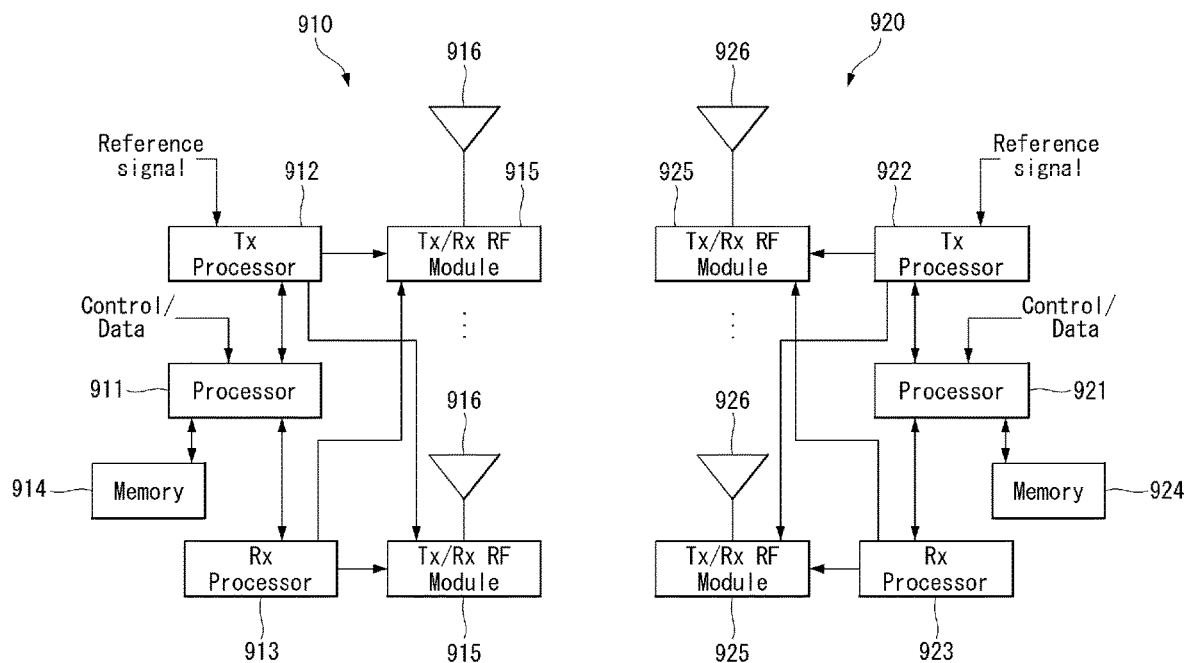
FIG. 1 shows an example of a block diagram of a wireless communication system to which methods proposed in the present specification is applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device(AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal transmission/reception method in wireless communication system

Figure 2:
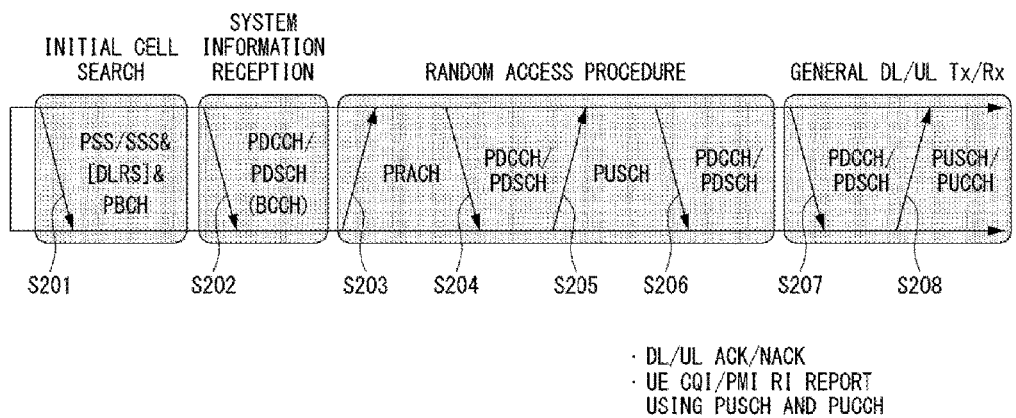
FIG. 2 is a diagram showing an example of a signal transmitting/receiving method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell.

The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtaind through an SSS of the cell, and information on the cell ID among 336 cell ID groups is provided/obtaind through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping.

The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3)

extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G-Communication

Figure 3:
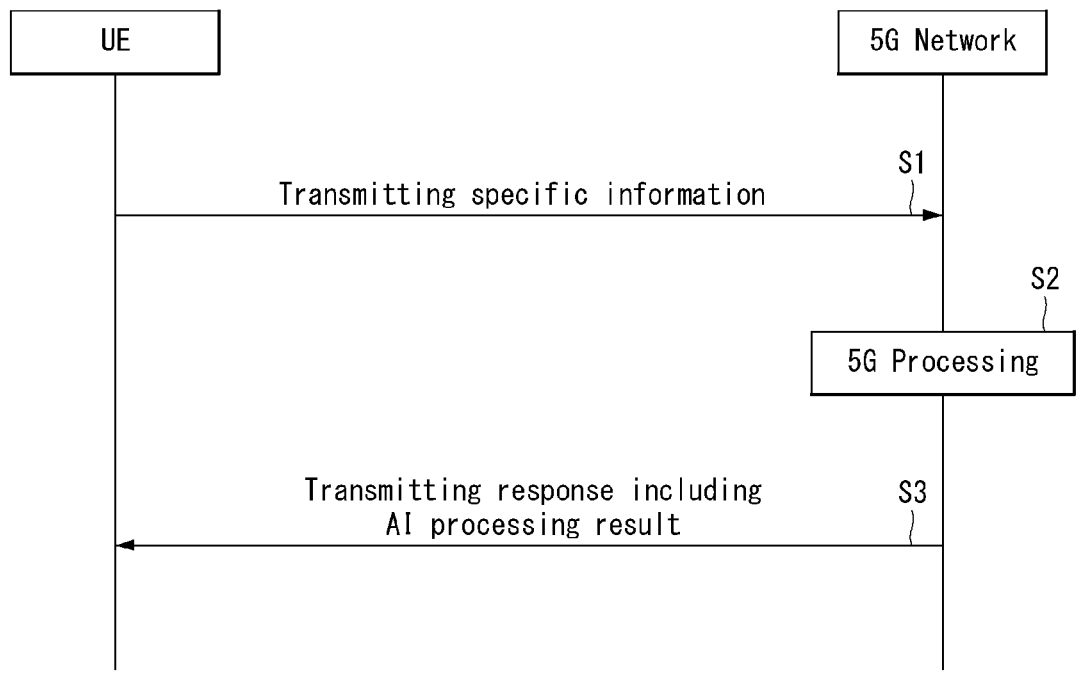
FIG. 3 shows an example of a user terminal and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE(S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
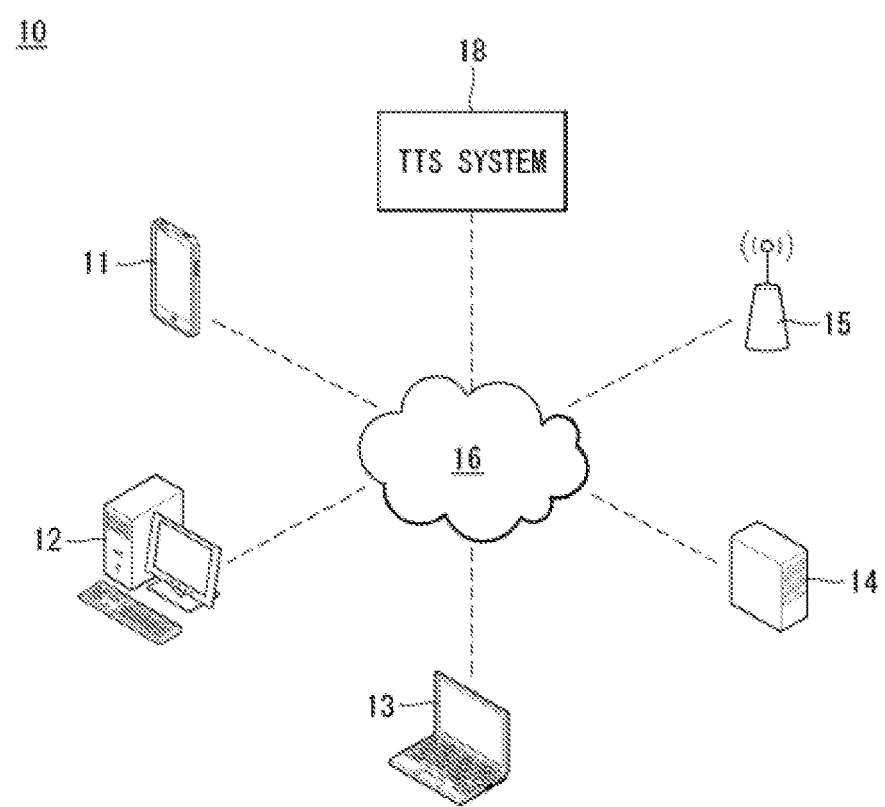
FIG. 4 shows an example of a schematic block diagram in which a text-to-speech (TTS) method according to an embodiment of the present invention is implemented.

FIG. 4 shows an example of a schematic block diagram in which a text-to-speech (TTS) method according to an embodiment of the present invention is implemented.

Referring to FIG. 4, a system in which a speech providing method is implemented according to an embodiment of the present invention may include as a speech providing apparatus 10, a network system 16, and a text-to-to-speech (TTS) system as a speech synthesis engine.

The at least one speech providing device 10 may include a mobile phone 11, a PC 12, a notebook computer 13, and other server devices 14. The PC12 and notebook computer 13 may connect to at least one network system 16 via a wireless access point 15. According to an embodiment of the present invention, the speech providing apparatus 10 may include an audio book and a smart speaker.

Meanwhile, the TTS system 18 may be implemented in a server included in a network, or may be implemented by on-device processing and embedded in the speech providing device 10. In the exemplary embodiment of the present invention, it is assumed that the TTS system 18 is implemented in the speech providing device 10.

Figure 5:
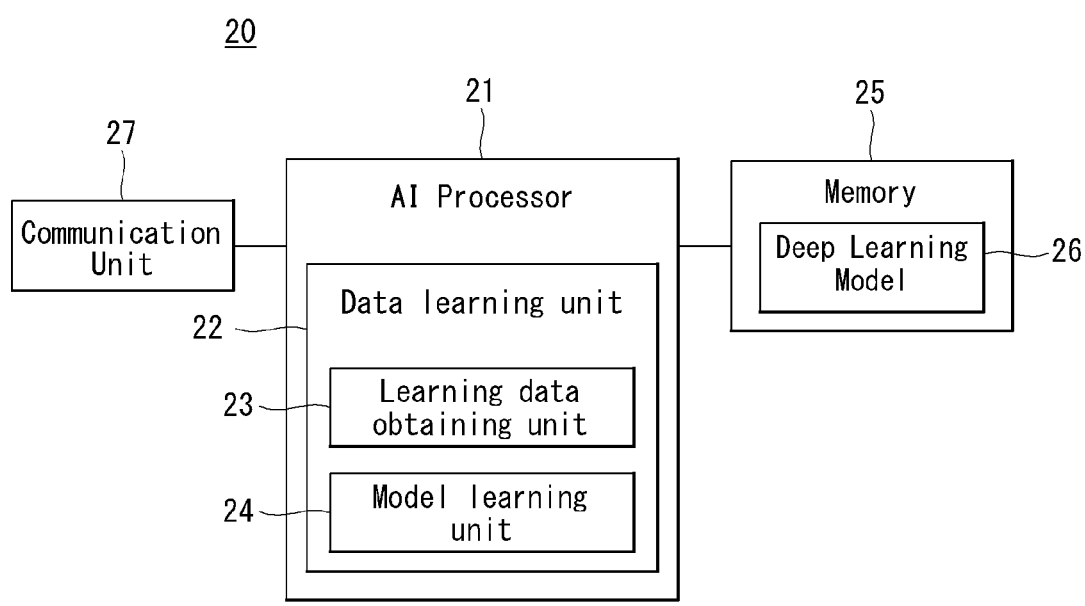
FIG. 5 shows a block diagram of an AI device that may be applied to one embodiment of the present invention.
Figure 6:
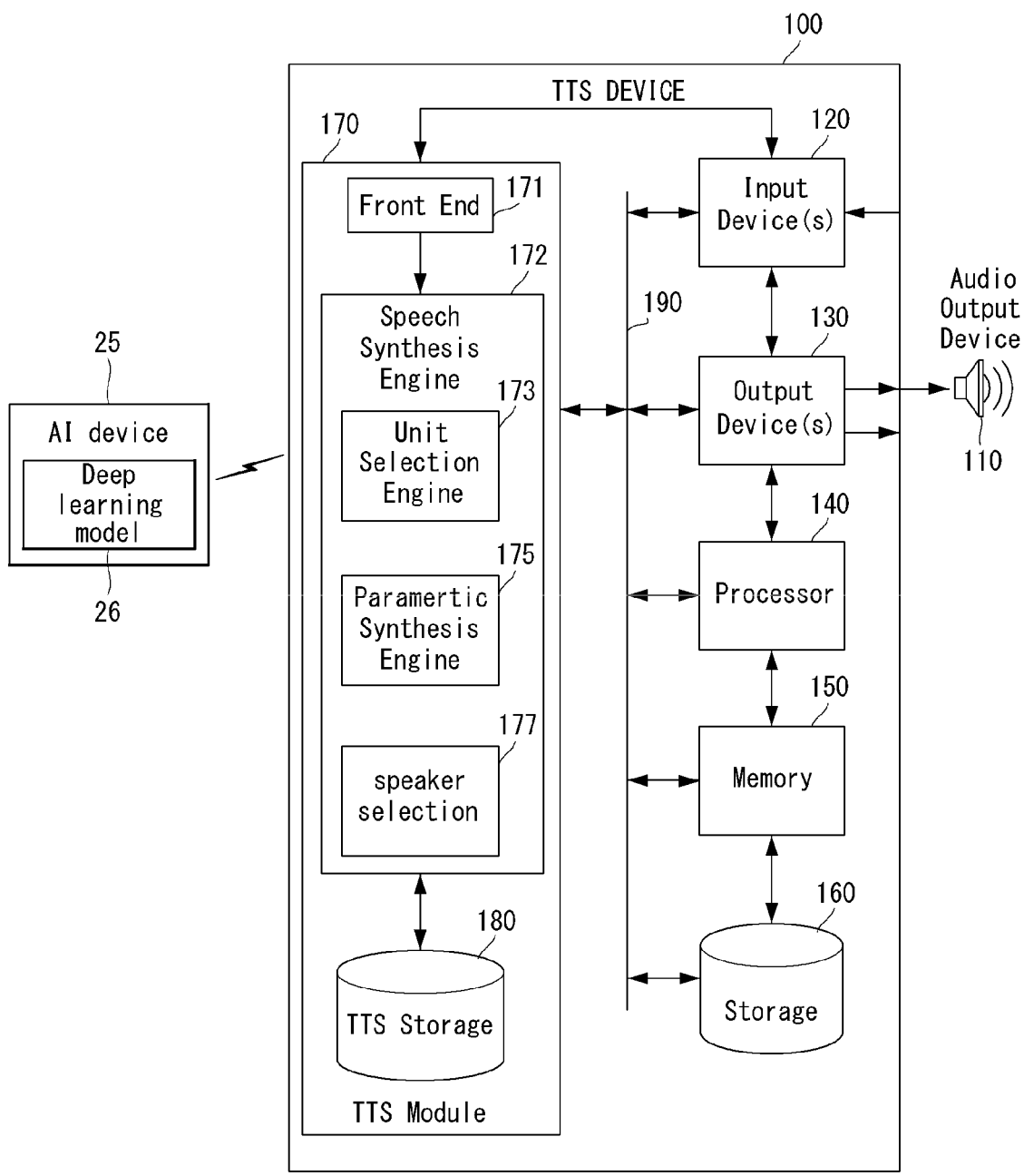
FIG. 6 is an exemplary block diagram of a TTS device according to an embodiment of the present invention.

FIG. 5 shows a block diagram of an AI device that may be applied to one embodiment of the present invention.

The AI device 20 may include an electronic device including an AI module capable of performing AI processing or a server including the AI module. In addition, the AI device 20 may be included in at least a part of the speech providing device 10 illustrated in FIG. 4 and may be provided to perform at least some of the AI processing together.

The AI processing may include all operations related to the speech providing of the speech providing device 10 shown in FIG. 5. For example, the AI processing may be a process of obtaining estimated noise information by analyzing the operating state of the speech providing device 10.

The AI device 20 may include an AI processor 21, a memory 25, and/or a communication unit 27.

The AI device 20 is a computing device capable of learning neural networks, and may be implemented as various electronic devices such as a server, a desktop PC, a notebook PC, a tablet PC, and the like.

The AI processor 21 may learn a neural network using a program stored in the memory 25.

In particular, the AI processor 21 may learn a neural network for obtaining estimated noise information by analyzing the operating state of each speech providing device. In this case, the neural network for outputting estimated noise information may be designed to simulate the human's brain structure on a computer, and may include a plurality of network nodes having weight and simulating the neurons of the human's neural network.

The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks(CNN), recurrent neural networks (RNN), a restricted boltzmann machine (RBM), deep belief networks (DBN), and a deep Q-network, and can be applied to fields such as computer vision, speech providing, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by obtaining learning data to be used for learning and by applying the obtaind learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data obtaining unit 23 and a model learning unit 24.

The learning data acquisition unit 23 may obtain training data for a neural network model for classifying and recognizing data. For example, the learning data acquisition unit 23 may obtain an operating state to be input to the neural network model and/or a feature value, extracted from the operating state, as the training data.

The model learning unit 24 can perform learning such that a neural network model has a determination reference about how to classify predetermined data, using the obtain learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The training data preprocessor may pre-process an obtained operating state so that the obtained operating state may be used for training for recognizing estimated noise information. For example, the training data preprocessor may process an obtained operating state in a preset format so that the model training unit 24 may use obtained training data for training for recognizing estimated noise information.

Furthermore, the training data selection unit may select data for training among training data obtained by the learning data acquisition unit 23 or training data pre-processed by the preprocessor. The selected training data may be provided to the model training unit 24. For example, the training data selection unit may select only data for a syllable, included in a specific region, as training data by detecting the specific region in the feature values of an operating state obtained by the speech providing device 10.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Figure 7:
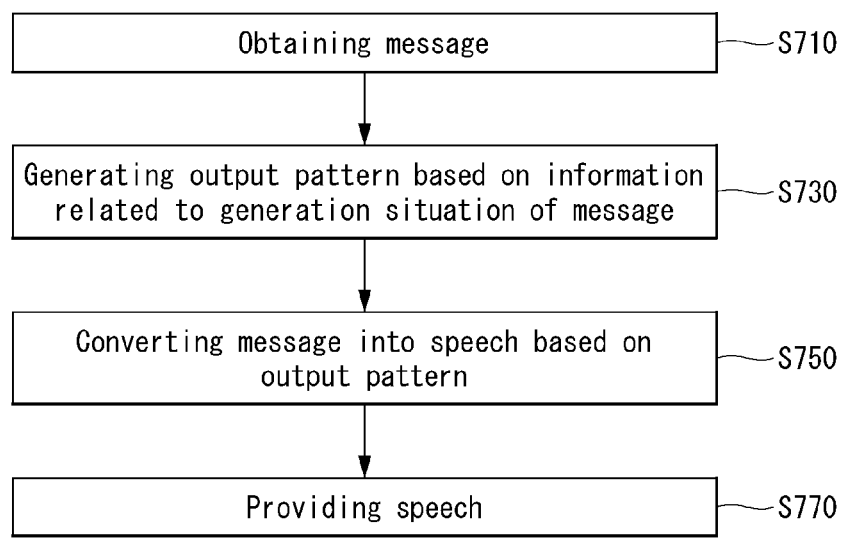
FIG. 7 is an exemplary block diagram of a TTS device according to an embodiment of the present invention.

FIG. 7 is an exemplary block diagram of a text-to-speech (TTS) device according to an embodiment of the present invention.

A TTS device 100 shown in FIG. 7 may include an audio output device 110 for outputting a voice processed by the TTS device 100 or by a different device.

FIG. 7 discloses the TTS device 100 for performing speech synthesis. An embodiment of the present invention may include computer-readable and computer-executable instructions that can be included in the TTS device 100. Although FIG. 7 discloses a plurality of elements included in the TTS device 100, configurations not disclosed herein may be included in the TTS device 100.

Meanwhile, some configurations disclosed in the TTS device 100 may be single configurations and each of them may be used multiple times in one device. For example, the TTS device 100 may include a plurality of input devices 120, an output device 130 or a plurality of controllers/processors 140.

A plurality of TTS devices may be applied to one TTS device. In such a multiple device system, the TTS device may include different configurations to perform various aspects of speech synthesis. The TTS device shown in FIG. 7 is merely an exemplary, may be an independent device, and may be implemented as one configuration of a large-sized device or system.

According to an embodiment of the present invention, a plurality of difference devices and a computer system may be, for example, applied to a universal computing system, a server-client computing system, a telephone computing system, a laptop computer, a mobile terminal, a PDA, and a tablet computer, etc. The TTS device 100 may be applied as a different device providing a speech recognition function, such as ATMs, kiosks, a Global Positioning System (GPS), a home appliance (e.g., a refrigerator, an oven, a washing machine, etc.), vehicles, ebook readers, etc. or may be applied as a configuration of the system.

Referring to FIG. 7, the TTS device 100 may include a speech output device 110 for outputting a speech processed by the TTS device 100 or by a different device. The speech output device 110 may include a speaker, a headphone, or a different appropriate configuration for transmitting a speech. The speech output device 110 may be integrated into the TTS device 100 or may be separated from the TTS device 100.

The TTS device 100 may include an address/data bus 224 for transmitting data to configurations of the TTS device 100. The respective configurations in the TTS device 100 may be directly connected to different configurations through the bus 224. Meanwhile, the respective configurations in the TTS device 100 may be directly connected to a TTS module 170.

The TTS device 100 may include a controller (processor) 140. A processor 208 may correspond to a CPU for processing data and a memory for storing computer-readable instructions to process data and storing the data and the instructions. The memory 150 may include a volatile RAM, a non-volatile ROM, or a different-type memory.

The TTS device 100 may include a storage 160 for storing data and instructions. The storage 160 may include a magnetic storage, an optical storage, a solid-state storage, etc.

The TTS device 100 may access a detachable or external memory (e.g., a separate memory card, a memory key drive, a network storage, etc.) through an input device 120 or an output device 130.

Computer instructions to be processed by the processor 140 to operate the TTS device 100 and various configurations may be executed by the processor 140 and may be stored in the memory 150, the storage 160, an external device, or a memory or storage included in the TTS module 170 described in the following. Alternatively, all or some of executable instructions may be added to software and thus embedded in hardware or firmware. An embodiment of the present invention may be, for example, implemented as any of various combinations of software, firmware and/or hardware.

The TTs device 100 includes the input device 120 and the output device 130. For example, the input device a microphone, a touch input device, a keyboard, a mouse, a stylus, or the audio output device 100 such as a different input device. The output device 130 may include a visual display or tactile display, an audio speaker, a headphone, a printer, or any other output device. The input device 120 and/or the output device 130 may include an interface for connection with an external peripheral device, such as a Universal Serial Bus (USB), FireWire, Thunderbolt, or a different access protocol. The input device 120 and/or the output device 130 may include a network access such as an Ethernet port, a modem, etc. The input device 120 and/or the output device may include a wireless communication device such as radio frequency (RF), infrared rays, Bluetooth, wireless local area network (WLAN) (e.g., WiFi and the like) or may include a wireless network device such as a 5G network, a long term evolution (LTE) network, a WiMAN network, and a 3G network. The TTS device 100 may include the Internet or a distributed computing environment through the input device 120 and/or the output device 130.

The TTS device 100 may include the TTS module 170 for processing textual data into audio waveforms including speeches.

The TTS module 170 may access to the bus 224, the input device 120, the output device 130, the audio output device 110, the processor 140, and/or a different configuration of the TTS device 100.

The textual data may be generated by an internal configuration of the TTS device 100. In addition, the textual data may be received from an input device such as a keyboard or may be transmitted to the TTS device 100 through a network access. A text may be a type of a sentence including a text, a number and/or a punctuation to convert into a speech by the TTS module 170. An input text may include a special annotation for processing by the TTS module 170 and may use the special annotation to indicate how a specific text is to be pronounced. The textual data may be processed in real time or may be stored or processed later on.

The TTS module 170 may include a front end 171, a speech synthesis engine 172, and a TTS storage 180. The front end 171 may convert input textual data into symbolic linguistic representation for processing by the speech synthesis engine 172. The speech synthesis engine 172 may convert input text into a speech by comparing annotated phonetic unit models and information stored in the TTS storage 180. The front end 171 and the speech synthesis engine 172 may include an embedded internal processor or memory, or may use a processor 140 included in the TTS device 100 or a memory. Instructions for operating the front end 171 and the speech synthesis engine 172 may be included in the TTS module 170, the memory 150 of the TTS device 100, the storage 160, or an external device.

Input of a text into the TTS module 170 may be transmitted to the front end 171 for a processing. The front end 171 may include a module for performing text normalization, linguistic analysis, and linguistic prosody generation.

While performing the text normalization, the front end 171 may process a text input and generate a standard text to thereby convert numbers, abbreviations, and symbols identically.

While performing the linguistic analysis, the front end 171 may generate language of a normalized text to generate a series of phonetic units corresponding to an input text. This process may be referred to as phonetic transcription. The phonetic units include symbol representation of sound units that are lastly coupled and output by the TTS device 100 as a speech. Various sound units may be used to divide a text for speech synthesis. The TTS module 170 may process a speech based on phonemes (individual acoustics), half-phonemes, di-phones (the last half of a phoneme coupled to a half of a neighboring phoneme), bi-phones (two continuous phones), syllables, words, phrases, sentences, or other units. Each word may be mapped to one or more phonetic units. Such mapping may be performed using a language dictionary stored in the TTS device 100.

Linguistic analysis performed by the front end 171 may include a process of identifying different syntactic elements, such as prefixes, suffixes, phrases, punctuations, and syntactic boundaries. Such syntactic elements may be used to output a natural audio waveform by the TTS module 170. The language dictionary may include letter-to-sound rules and other tools for pronouncing a previously unidentified word or letter combination that can be made by the TTS module 170. In general, the more the information is included in the language dictionary, the higher the quality of speech output can be ensured.

Based on the linguistic analysis, the front end 171 may generate linguistic prosody of which annotation is processed to prosodic characteristics so that phonetic units represent how final acoustic units has to be pronounced in a final output speech.

The prosodic characteristics may be referred to as acoustic features. While an operation of this step is performed, the front end 171 may integrate the acoustic features into the TTS module 170 in consideration of random prosodic annotations that accompanies a text input. Such acoustic features may include pitch, energy, duration, etc. Application of the acoustic features may be based on prosodic models that can be used by the TTS module 170. Such prosodic models represent how phonetic units are to be pronounced in a specific situation. For example, the prosodic models may take into consideration of a phoneme's position in a syllable, a syllable's position in a word, a word's position in a sentence or phrase, neighboring phonetic units, etc. Likewise to the language dictionary, the more information on prosodic models exists, the higher the quality of speech output is ensured.

An output from the front end 171 may include a series of phonetic units which are annotation-processed into prosodic characteristics. The output from the front end 171 may be referred to as symbolic linguistic representation. The symbolic linguistic representation may be transmitted to the speech synthesis engine 172. The speech synthetic engine 172 may convert the speech into an audio wave so as to output the speech to a user through the audio output device 110. The speech synthesis engine 172 is configured to convert an input test into a high-quality natural speech in an efficient way. Such a high-quality speech may be configured to be pronounced in a similar way of a human speaker as much as possible.

The speech synthesis engine 172 may perform synthesis using at least one or more other methods.

The unit selection engine 173 compares a recorded speech database with a symbolic linguistic representation generated by the front end 171. The unit selection engine 173 matches the symbol linguistic representation and a speech audio unit in the recorded speech database. In order to form a speech output, matching units may be selected and the selected matching units may be connected to each other. Each unit includes audio waveforms, which correspond to a phonetic unit such as a short WAV file of specific sound along with description of various acoustic features associated with the WAV file (pitch, energy, etc.), and also includes other information such as a position at which the phonetic unit is represented in a word, a sentence, a phrase, or a neighboring phonetic unit.

The unit selection engine 173 may match an input text using all information in a unit database in order to generate a natural waveform. The unit database may include examples of multiple speech units that provide different options to the TTS device 100 to connect the units to a speech. One of advantages of unit selection is that a natural speech output can be generated depending on a size of the database. In addition, the greater the unit database, the more natural the speech can be constructed by the TTS device 100.

Meanwhile, speech synthesis can be performed not just by the above-described unit selection synthesis, but also by parameter synthesis. In the parameter synthesis, synthesis parameters such as frequency, volume, and noise can be varied by a parameter synthesis engine 175, a digital signal processor, or a different audio generating device in order to generate artificial speech waveforms.

The parameter synthesis may match symbolic linguistic representation with a desired output speech parameter by using an acoustic model and various statistical techniques. In the parameter synthesis, a speech can be processed even without a large-capacity database related to unit selection and a processing can be performed at a high speed. The unit selection synthesis technique and the parameter synthesis technique may be performed individually or in combination to thereby generate a speech audio output.

The parameter speech synthesis may be performed as follows. The TTS module 170 may include an acoustic model that can transform symbolic linguistic representation into a synthetic acoustic waveform of a test input based on audio signal manipulation. The acoustic model may include rules that can be used by the parameter synthesis engine 175 to allocate specific audio waveform parameters to input phonetic units and/or prosodic annotations. The rules may be used to calculate a score indicating a probability that a specific audio output parameter (frequency, volume, etc.) may correspond to input symbolic linguistic representation from the pre-processor 171.

The parameter synthesis engine 175 may apply multiple techniques to match a speech to be synthesized with an input speech unit and/or a prosodic annotation. One of general techniques employs Hidden Markov Model (HMM). The HMM may be used to determine a probability for an audio output to match a text input. In order to artificially synthesize a desired speech, the HMM may be used to convert linguistic and acoustic space parameters into parameters to be used by a vocoder (digital voice encoder).

The TTS device 100 may include a speech unit database to be used for unit selection.

The speech unit database may be stored in the TTS storage 180, the storage 160, or another storage configuration. The speech unit database may include a recorded speech voice. The speech voice may be a text corresponding to utterance contents. In addition, the speech unit database may include a recorded speech (in the form of an audio waveform, a feature factor, or another format) occupying a considerable storage space in the TTS device 100. Unit samples in the speech unit database may be classified in various ways including a phonetic unit (a phoneme, a diphone, a word, and the like), a linguistic prosody label, an acoustic feature sequence, a speaker identity, and the like.

When matching symbolic linguistic representation, the speech synthesis engine 172 may select a unit in the speech unit database that most closely matches an input text (including both a phonetic unit and a prosodic symbol annotation). In general, the large the capacity of the speech unit database, the more the selectable unit samples and thus the more accurate the speech output.

Audio waveforms including a speech output to a user may be transmitted to the audio output device 110 from the TTS module 213 so that the audio waveforms are output to a user. Audio waveforms including a speech may be stored in multiple different formats such as feature vectors, non-compressed audio data, or compressed audio data. For example, an audio output may be encoded and/or compressed by an encoder/decoder before the transmission. The encoder/decoder may encode or decode audio data such as digitalized audio data, feature vectors, etc. In addition, the function of the encoder/decoder may be included in an additional component or may be performed by the processor 140 and the TTS module 170.

Meanwhile, the TTS storage 180 may store different types of information for speech recognition.

Contents in the TTS storage 180 may be prepared for general TTS usage and may be customized to include sound and words that can be used in a specific application. For example, for TTS processing by a GPS device, the TTS storage 180 may include a customized speech specialized in position and navigation.

In addition, the TTS storage 180 may be customized to a user based on a personalized desired speech output. For example, the user may prefer an output voice of a specific gender, a specific accent, a specific speed, a specific emotion (e.g., a happy voice). The speech synthesis engine 172 may include a specialized database or model to explain such user preference.

The TTs device 100 may perform TTS processing in multiple languages. For each language, the TTS module 170 may include data, instructions, and/or components specially configured to synthesize a speech in a desired language.

For performance improvement, the TTS module 213 may modify or update contents of the TTS storage 180 based on a feedback on a TTS processing result, and thus, the TTS module 170 may improve speech recognition beyond a capability provided by a training corpus.

As the processing capability of the TTS device 100 improves, a speech output is possible by reflecting an attribute of an input text. Alternatively, although an emotion attribute is not included in the input text, the TTS device 100 may output a speech by reflecting intent (emotion classification information) of a user who has written the input text.

Indeed, when a model to be integrated into a TTS module for performing TTS processing is established, the TTS system may integrate the above-described various configurations and other configurations. For example, the TTS device 100 may insert an emotion element into a speech.

In order to output the speech added with the emotion classification information, the TTS device 100 may include an emotion insertion module 177. The emotion insertion module 177 may be integrated into the TTS module 170 or integrated as a part of the pre-processor 171 or the speech synthesis engine 172. The emotion insertion module 177 may realize emotion classification information-based TTS using metadata that corresponds to an emotion attribute. According to an embodiment of the present invention, the metadata may be in markup language and preferably in speech synthesis markup language (SSML). A method of performing emotion classification information-based TTS using SSML will be hereinafter described in detail.

In fact, when a model to be integrated into a TTS module for performing a TTS processing is established, the TTS system may integrate another constituent component with the aforementioned various constituent components. For example, the TTS device 100 may include a block for setting a speaker.

A speaker setting unit 177 may set an individual speaker for each character included in a script. The speaker setting unit 177 may be integrated into a TTS module 170 or may be integrated as a part of a pre-processor 171 or a speech synthesis engine 172. The speaker setting unit 177 synthesizes texts corresponding to multiple characters with a voice of a set speaker using metadata corresponding to a speaker profile.

According to an embodiment of the present invention, the metadata may use markup language and may preferably use speech synthesis markup language (SSML).

In the above, the outlines for performing AI processing by applying the 5G communication and the 5G communication necessary to implement the voice providing method according to an embodiment of the present invention, and transmitting and receiving the AI processing result.

Hereinafter, a specific method of intelligently providing a speech (TTS) according to an embodiment of the present invention will be described with reference to necessary drawings. In detail, the operation of the speech providing apparatus for generating the output pattern of the TTS will be described with reference to FIGS. 7 to 21, and the operation of the speech providing apparatus for restoring the output pattern of the TTS will be described with reference to FIGS. 22 to 30.

FIG. 7 is a flowchart illustrating a method for providing a speech according to an embodiment of the present invention.

As shown in FIG. 7, a method for providing a speech S700 of a speech providing apparatus 10 according to an embodiment of the present invention includes steps S710, S730, S750, and S770 of FIG. 7, and a detailed description of each step is as follows.

First, the speech providing apparatus 10 may obtain a message from the outside (S 710).

Here, the speech providing apparatus 10 may analyze a speech signal or text information received through the input device 120 to obtain the message.

Subsequently, the speech providing apparatus 10 may generate a pattern for outputting the message based on information related to a situation at a time when the message is generated (S730).

Regarding information related to a generation situation of the message, for one example, the speech providing apparatus 10 may input the message to a pre-learned artificial neural network (ANN), and obtain information related to the situation at a time the message is created as an output of the artificial neural network. For another example, the speech providing apparatus 10 may store the information related to a generation situation of the message in advance in the memory 150, when the message is received, and read out the information related to a situation related to the received message from contents stored in the memory 150.

Here, the information related to a generation situation of the message may include information related to a receiver of the message, information related to a creator of the message, or information related to a surrounding environment at the time the message is generated.

Here, the output pattern may mean a form of displaying the speech on the display or a form of outputting the speech through the speaker.

Regarding the output pattern, for one example, the speech providing apparatus 10 may input the message and the situation information to another pre-learned artificial neural network, and obtain the output pattern as its output. For another example, the speech providing apparatus 10 may generate an output pattern based on a user input through the input device 120 with the message and the situation information.

Next, the speech providing apparatus 10 may convert the message into a speech based on the output pattern (Text to Speech, TTS) (S750).

Finally, the speech providing apparatus 10 may provide the converted speech (S770).

For example, the speech providing apparatus 10 may display the message on the display (e.g., the output device 130) based on the information related to a generation situation of the message while converting the message into a speech based on the generated output pattern. For another example, the speech providing apparatus 10 may output the message through the speaker (e.g., the output device 130) based on the information related to a generation situation of the message.

Figure 8:
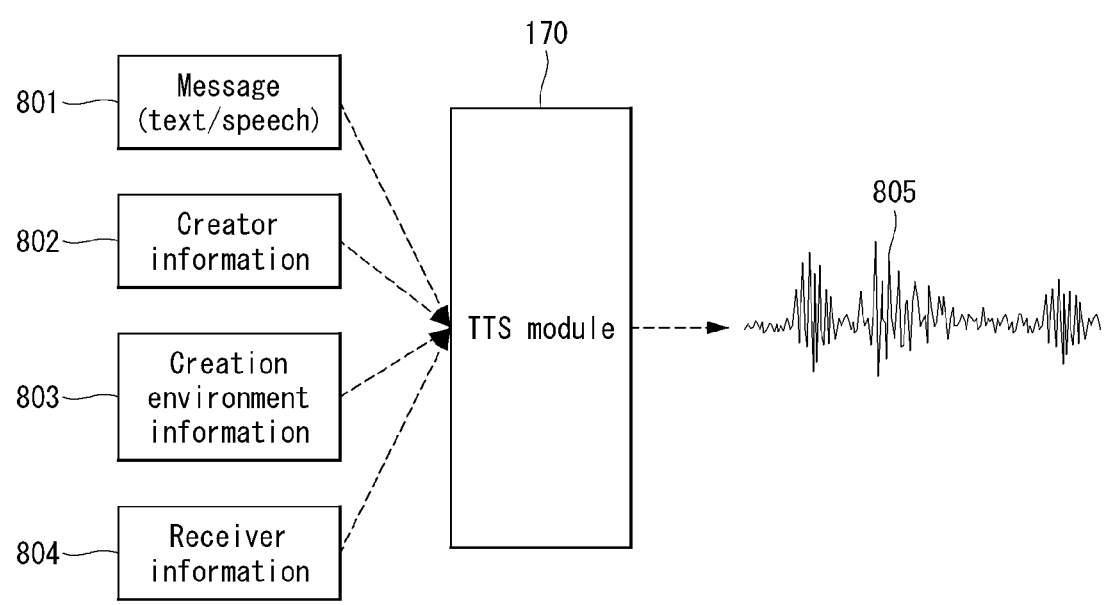
FIG. 8 illustrates a TTS module providing a speech.

FIG. 8 illustrates a TTS module providing a speech.

As shown in FIG. 8, a TTS module 170 may provide a speech (TTS) 805 using a message 801 and information related to a generation situation of the message 802, 803, and 804.

For example, the TTS module 170 may receive the message 801 in a form of a text or a speech, and obtain creator information 802, creation environment information 803, and receiver information 804, which are information related to the situation at the time of generation of the message 801.

After obtaining the situation information at the time of message generation, the TTS module 170 may input at least one of the message 801, the creator information 802, the creation environment information 803 and the receiver information 804 to the artificial neural network, and obtain an output pattern as an output of the artificial neural network.

The TTS module 170 may apply the output pattern to the message 801 to convert (TTS) the message 801 into the speech 805.

The TTS module 170 may transmit the converted speech 805 to other external speech providing apparatus. Here, the TTS module 170 may transmit output pattern information together with the converted speech 805 to the other speech providing apparatus.

In addition, the TTS module 170 may output the converted speech 805 to the outside through the output device 130 based on the output pattern. For example, the TTS module 170 may display the converted speech 805 on the display or output it through the speaker.

Figure 9:
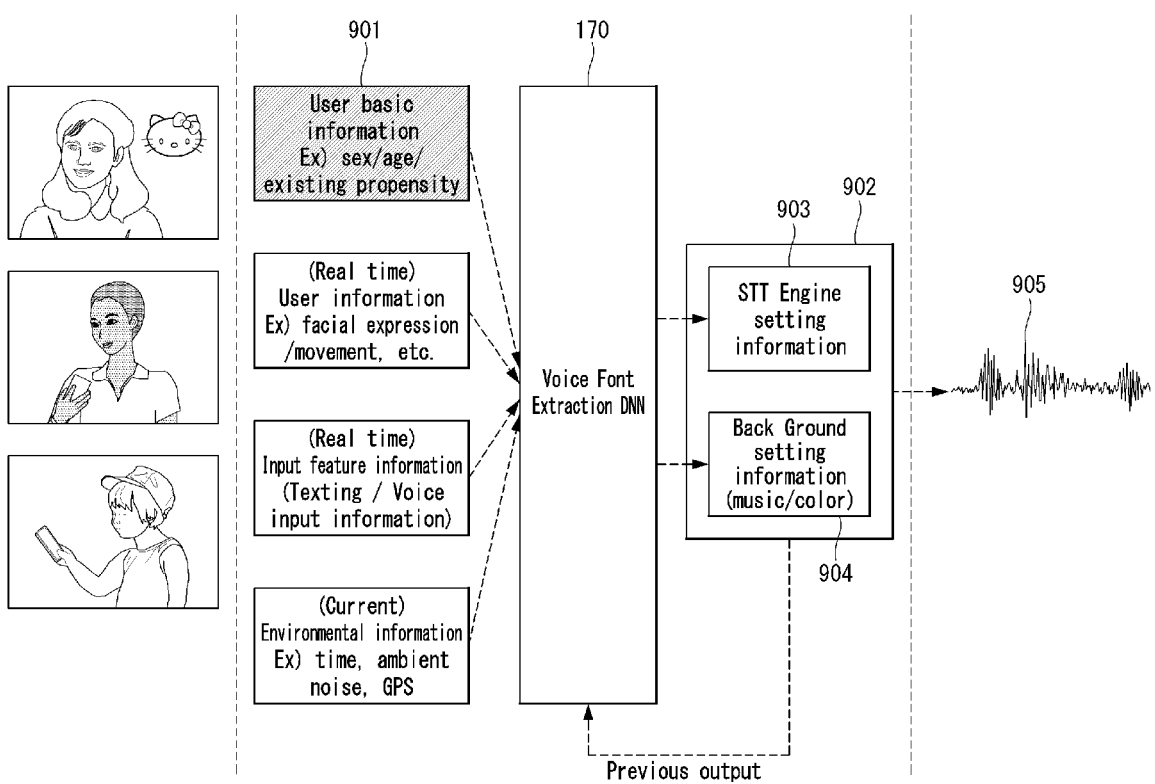
FIG. 9 illustrates an example of providing a speech based on the creator information in FIG. 8.

FIG. 9 illustrates an example of providing a speech based on the creator information in FIG. 8.

As shown in FIG. 9, the creator information may include user basic information 901 such as information related to sex, age, nationality, and existing propensity of the message creator (or a preset creator character).

The TTS module 170 may input the user basic information 901 to the pre-learned artificial neural network (Voice Font Extraction DNN).

The TTS module 170 may obtain output pattern information 902 as the output of the artificial neural network. Specifically, the TTS module 170 may obtain message configuration (Speech to Text (STT) Engine) setting information 903 and background setting information 904 as the output of the artificial neural network. Here, the message configuration setting information 903 may include information related to a form of providing the speech. Here, the background setting information 904 may include information related to a form of displaying the speech on the display or a form (music/color) output through the speaker.

Here, the TTS module 170 may learn the artificial neural network using the output pattern information 902 previously output.

The TTS module 170 may provide a speech 905, which is converted by applying the output pattern information 902 to the message, to another external device.

Figure 10:
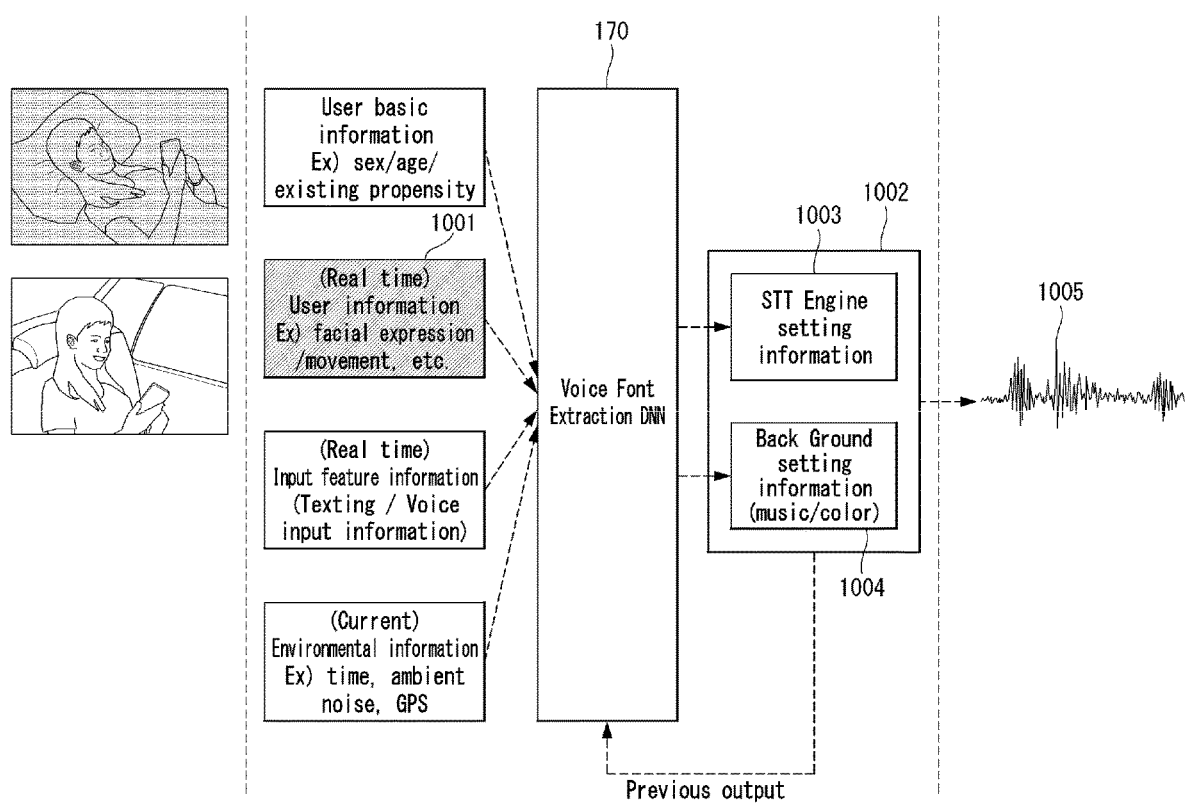
FIG. 10 illustrates another example of providing a speech based on the creator information in FIG. 8.

FIG. 10 illustrates another example of providing a speech based on the creator information in FIG. 8.

As shown in FIG. 10, the creator information may include real-time user information (1001) such as facial expression, emotion, and movement of the message creator (or a preset creator character). For example, the real-time user information 1001 may include information related to whether the creator wrote the message while sleeping, the creator wrote the message while walking, the creator uttered the speech with a sleepy voice, the creator uttered the speech with an angry voice, the creator uttered the speech with a laughing voice, or wrote the message while running or walking.

The TTS module 170 may input the real-time user information 1001 to the pre-learned artificial neural network (Voice Font Extraction DNN).

The TTS module 170 may obtain output pattern information 1002 as the output of the artificial neural network. Specifically, the TTS module 170 may obtain message configuration (Speech to Text (STT) Engine) setting information 1003 and background setting information 1004 as the output of the artificial neural network.

The TTS module 170 may provide a speech 1005, which is converted by applying the output pattern information 1002 to the message, to another external device.

For example, when the creator writes the message while moving, the TTS module 170 may convert the speech 1005 by applying a tossing form of output patterns to the message by reflecting the real-time user information.

Figure 11:
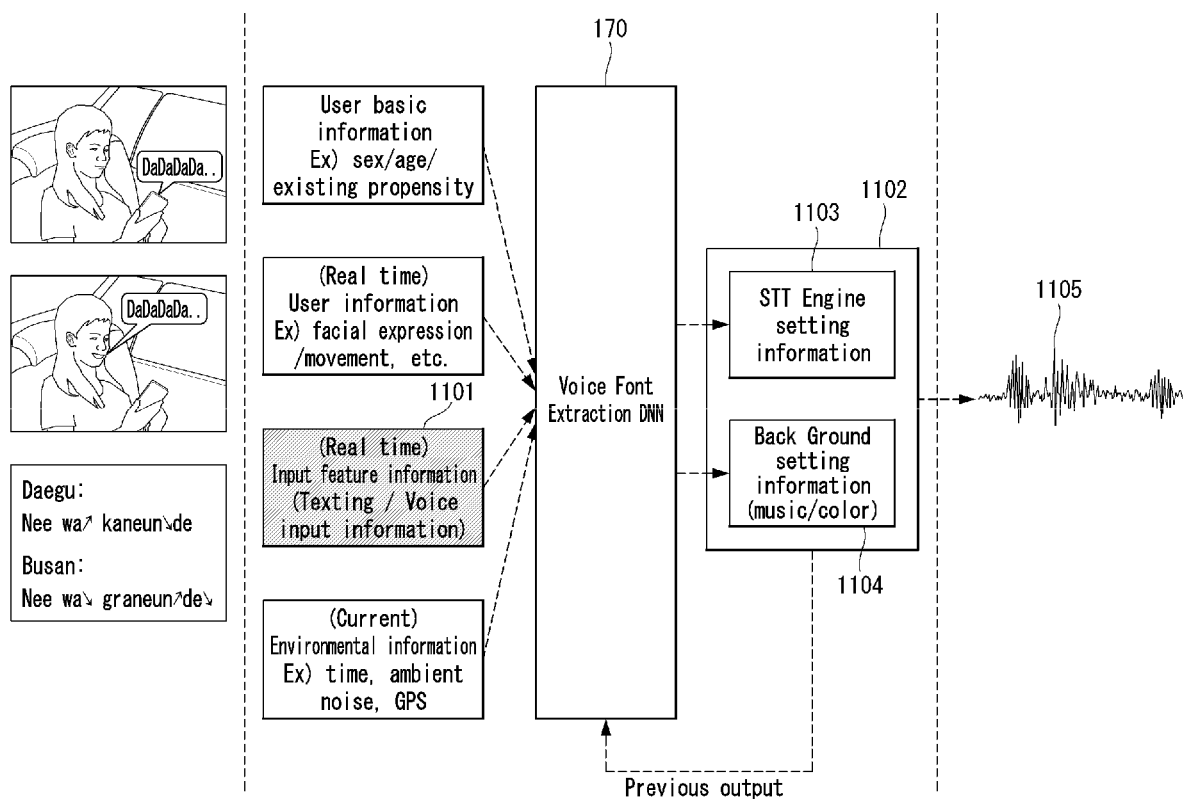
FIG. 11 illustrates another example of providing a speech based on the creator information in FIG. 8.

FIG. 11 illustrates another example of providing a speech based on the creator information in FIG. 8.

As shown in FIG. 11, the creator information may include real-time input feature information 1101 including information related to a method of creating a text of the message creator (or a preset creator character) or information related to a method of uttering the speech. For example, the real-time input feature information 1101 may include information related to a typing speed of the text, a time at which the message was created, the number of times the text was modified, a speed of speech input, or utterance intonation.

The TTS module 170 may input the real-time input feature information 1101 to the pre-learned artificial neural network (Voice Font Extraction DNN).

The TTS module 170 may obtain output pattern information 1102 as the output of the artificial neural network. Specifically, the TTS module 170 may obtain message configuration (Speech to Text (STT) Engine) setting information 1103 and background setting information 1104 as the output of the artificial neural network.

The TTS module 170 may provide a speech 1105, which is converted by applying the output pattern information 1102 to the message, to another external device.

For example, when the creator slowly utters a speech, the TTS module 170 may set the output pattern to be slow and apply it to the message to convert the speech 1105 by reflecting the information.

Figure 12:
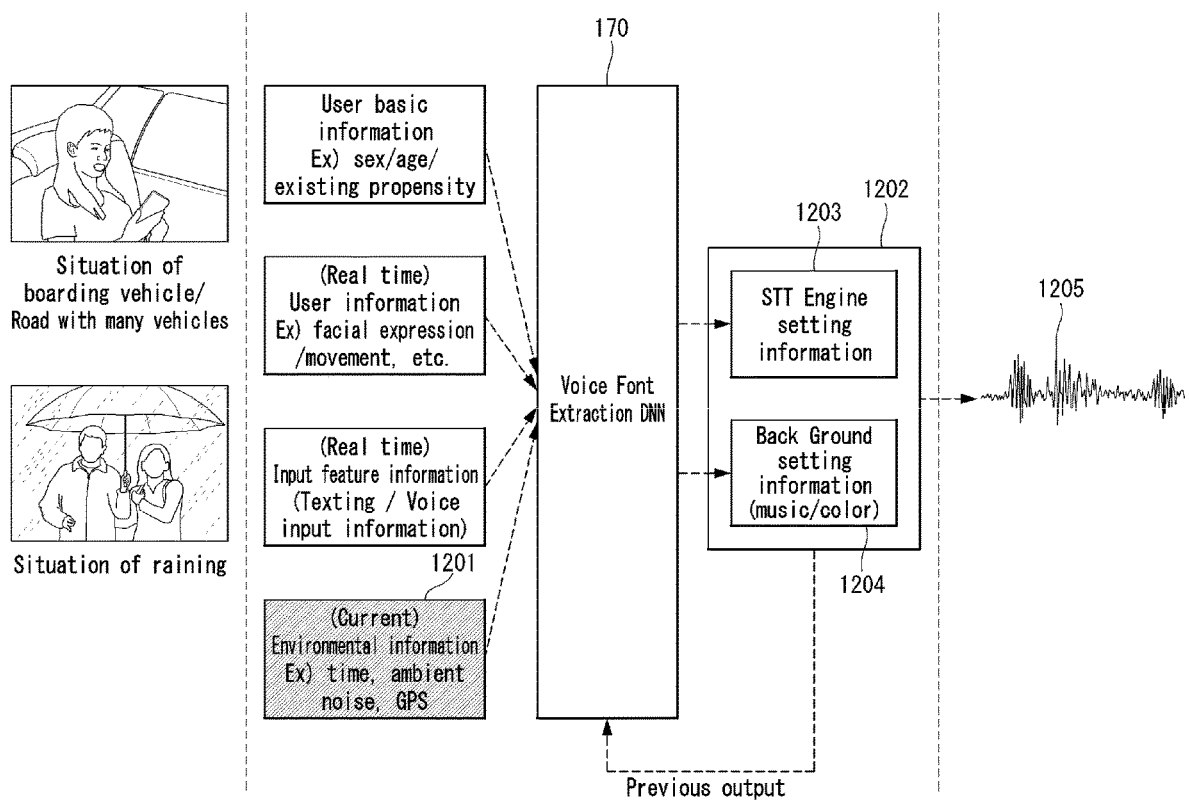
FIG. 12 illustrates another example of providing a speech based on the surrounding environment information of FIG. 8.

FIG. 12 illustrates another example of providing a speech based on the surrounding environment information of FIG. 8.

As shown in FIG. 12, the surrounding environment information may include environment information 1201 including information related to time, ambient noise, and location (GPS information) at the time of message creation. For example, the environment information 1201 may include information indicating a situation in which a message creator has boarded a vehicle, an environment related to a road with many vehicles, and a situation of raining.

The TTS module 170 may input the environment information 1201 and the message to the artificial neural network, and obtain an output pattern 1202 as an output thereof. The output pattern 1202 may include message configuration setting information 1203 and background setting information 1204.

The TTS module 170 may provide a speech 1205, which is converted by applying the output pattern information 1202 to the message, to another external device.

For example, when a message is created in a road environment with many vehicles or in a rainy weather, the TTS module 170 may provide the speech 1205 by adding a vehicle engine noise or a rainy sound to the background music as the output pattern.

Figure 13:
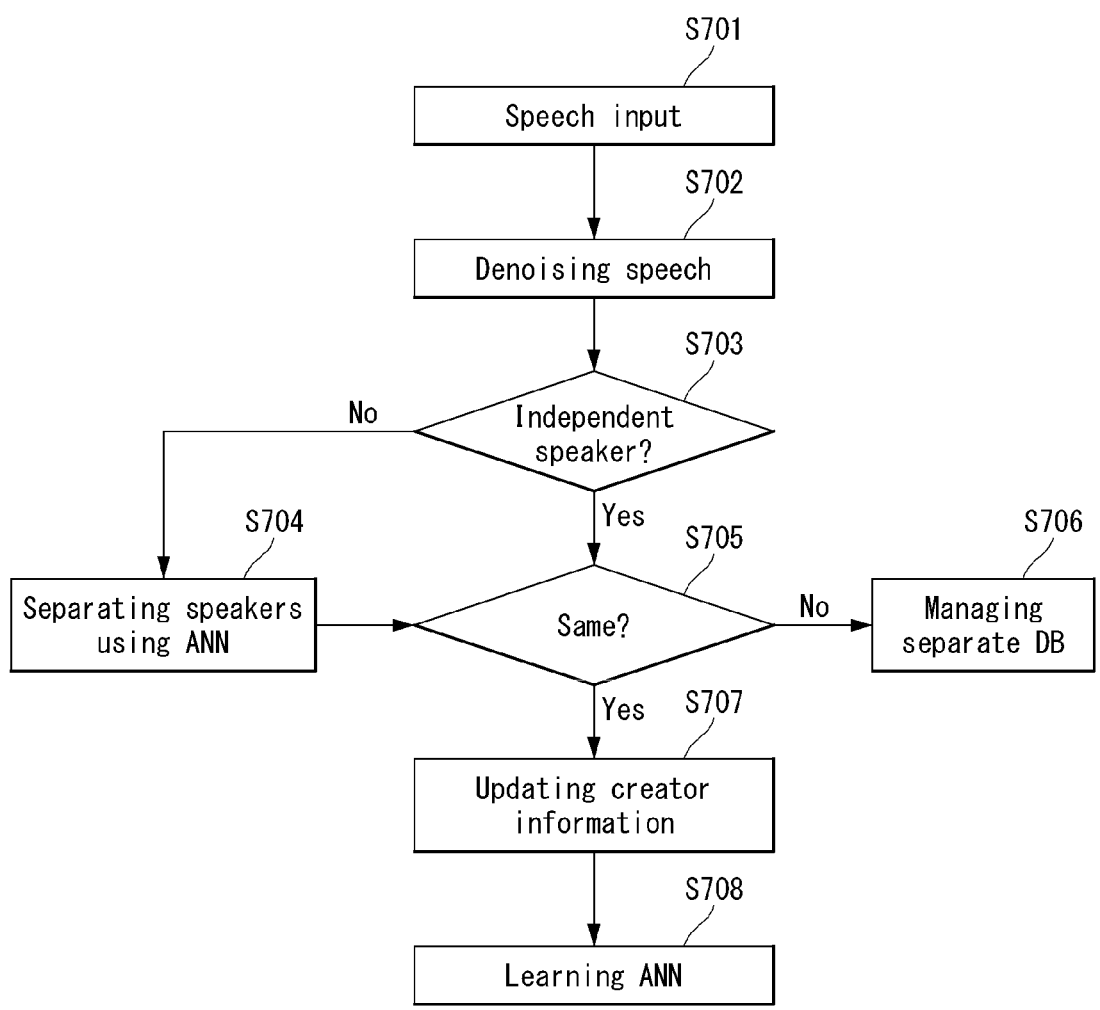
FIG. 13 is a flowchart of an example of learning an artificial neural network for generating an output pattern.

FIG. 13 is a flowchart of an example of learning an artificial neural network for generating an output pattern.

As shown in FIG. 13, the speech providing apparatus 10 may receive a speech input (S701).

For example, the speech input may include data related to a call of a speaker or data related to speech recognition of a user.

For example, the speech providing apparatus 10 may receive speech inputs of a plurality of speakers. Here, the speech providing apparatus 10 may receive not only the user of the speech providing apparatus 10 but also the speech input of the other party talking with the user.

Next, the speech providing apparatus 10 may denoise the received speech input (S702).

Subsequently, the speech providing apparatus 10 may determine whether the speaker included in the speech input is an independent speaker (S703).

As a result of the determination, when the plurality of speakers other than the independent speakers are included in the speech input, the speech providing apparatus 10 may separate the plurality of speakers using the artificial neural network (ANN) (S704).

As a result of the determination, if the speaker is the independent speaker or after step S704, the speech providing apparatus 10 may determine whether one of the speakers stored in the existing DB is the same as the independent/separated speaker (S705).

As a result of the determination, if the speaker is a new speaker that is not the same as the existing speaker, the speech providing apparatus 10 may manage a recognized speaker through a separate DB (S706).

As a result of the determination, if the speaker is the same as the existing speaker, the speech providing apparatus 10 may update the information (DB) related to the creator (speaker) stored in the existing DB (S707).

Here, the speech providing apparatus 10 may update new information obtained in relation to the creator (speaker) in the existing DB in the TAG form. For example, the speech providing apparatus 10 may subdivide an audio tag based on information input by the user or existing information derived from deduction in an edge device (e.g., input device 120) and may update the subdivided audio tag in the existing DB.

In addition, the speech providing apparatus 10 may update a place label related to the speech input of the creator in the existing DB (when a call is made at a library, work or home), a time label (when the voice can be lost depending on night or day), a conversation partner label (sex, relationship (a friend/family/boss/unknown person), intimacy (a frequent conversation person, a rare conversation person), age (a child/adult) of the conversation partner) in the existing DB.

Finally, the speech providing apparatus 10 may learn the artificial neural network (ANN) using the obtained speech input (S708).

Figure 14:
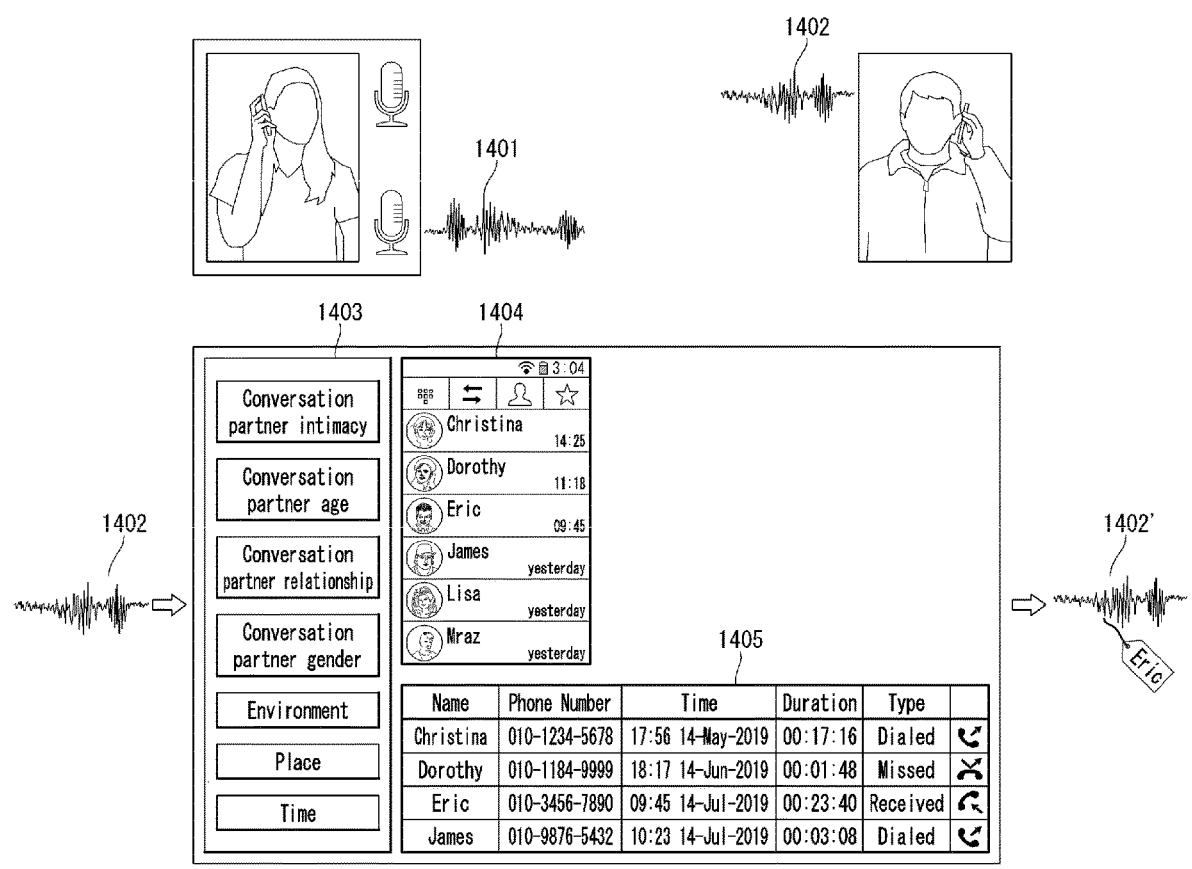
FIG. 14 illustrates a process of learning an artificial neural network used to obtain an output pattern.

FIG. 14 illustrates a process of learning an artificial neural network used to obtain an output pattern.

As shown in FIG. 14, the speech providing apparatus 10 may obtain a speech 1401 of a speech utterer and a speech 1402 of a conversation partner.

The speech providing apparatus 10 may learn the artificial neural network using the speech 1401 of the speech utterer or the speech 1402 of the conversation partner.

For example, the speech providing apparatus 10 may learn the artificial neural network using the speech 1402 of the conversation partner. For example, the speech providing apparatus 10 may generate a DB 1405 related to the conversation partner using situation information 1403 and call history data 1404 obtained together with the speech 1402 of the conversation partner, and may learn the artificial neural network by analyzing the DB 1405 and the speech 1402 of the conversation partner.

Figure 15:
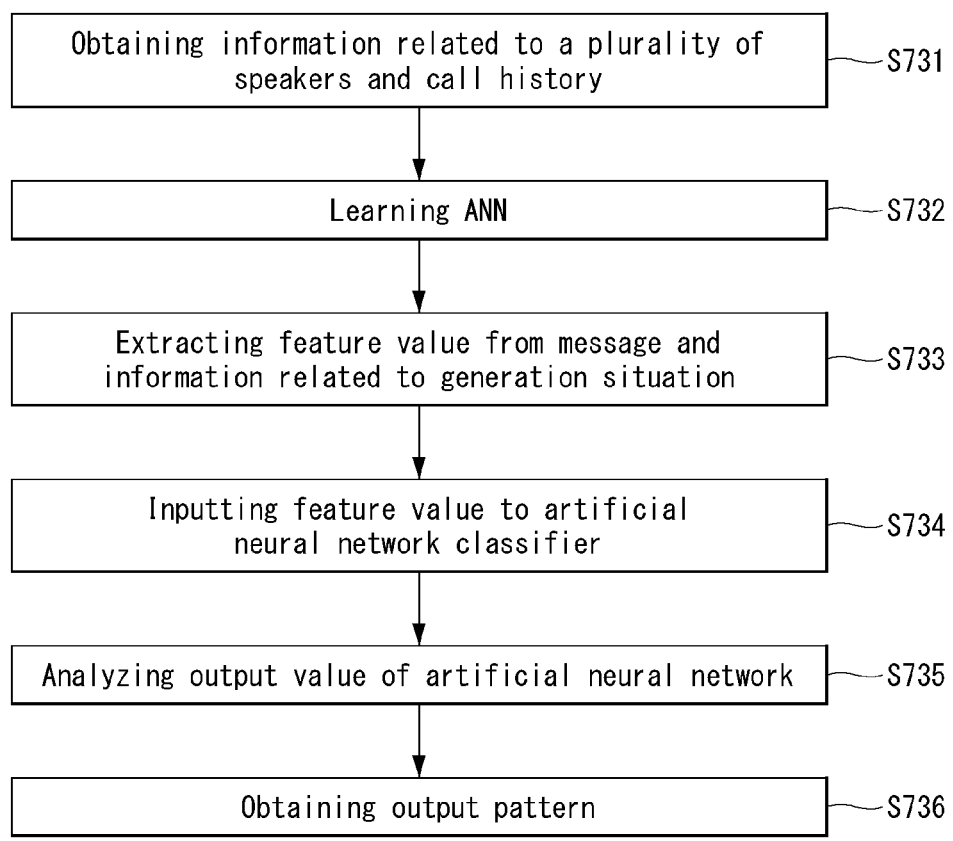
FIG. 15 is a flowchart illustrating an example of a detailed process of obtaining an output pattern.

FIG. 15 is a flowchart illustrating an example of a detailed process of obtaining an output pattern.

As shown in FIG. 15, the speech providing apparatus 10 may obtain an output pattern through step S730 (S731 to S736) of FIG. 15, and a detailed description will be given below.

First, the speech providing apparatus 10 may obtain information related to a plurality of speakers and a call history (S731).

Next, the speech providing apparatus 10 may learn the artificial neural network as shown in FIG. 14 using the information related to the plurality of speakers and the call history (S732).

Subsequently, the speech providing apparatus 10 may extract a feature value from a message and information related to a generation situation of the message (S733).

Next, the speech providing apparatus 10 may input the feature value to a pre-learned artificial neural network classifier for extracting the output pattern (S734).

Next, the speech providing apparatus 10 may analyze an output value of the artificial neural network (S735).

Finally, the speech providing apparatus 10 may obtain an output pattern for outputting the message as the output of the artificial neural network (S736).

Figure 16:
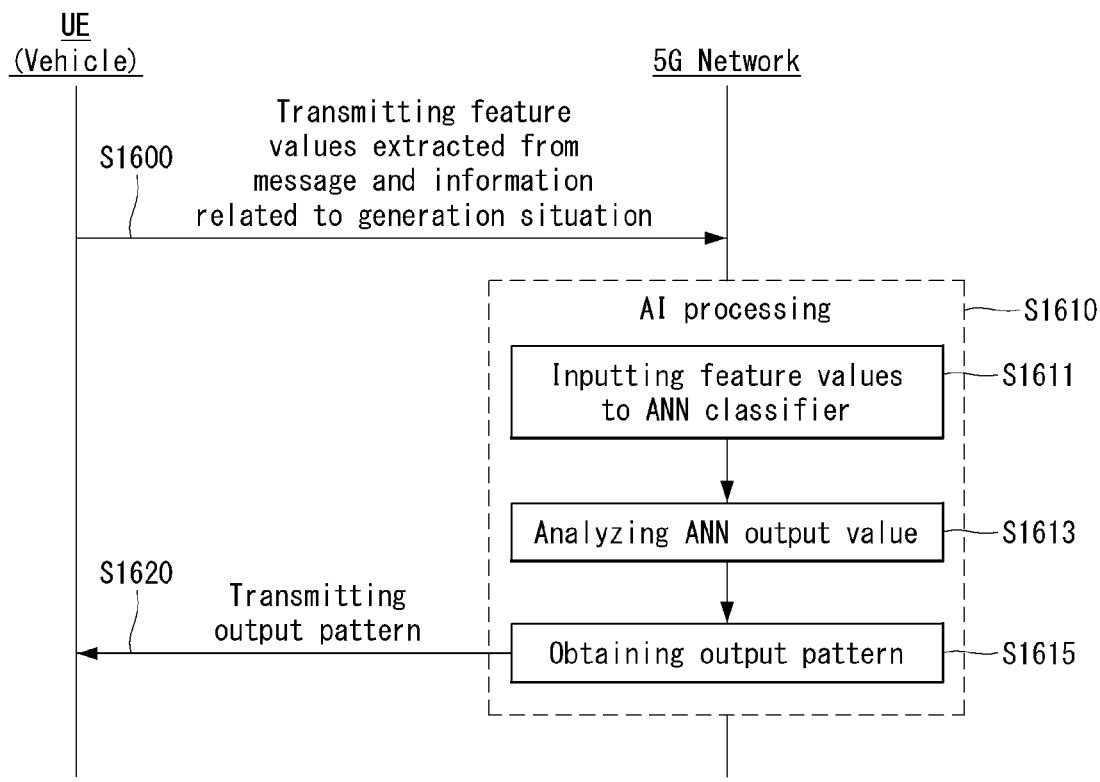
FIG. 16 illustrates a process of performing the process of FIG. 15 through a 5G network.

FIG. 16 illustrates a process of performing the process of FIG. 15 through a 5G network.

In the above-described FIG. 15, an example in which the operation of obtaining the output pattern through the AI processing is implemented in the processing of the speech providing apparatus 10 has been described, but the present invention is not limited thereto.

For example, as shown in FIG. 16, the AI processing may be performed on the 5G network based on sensing information received from the speech providing apparatus 10.

The TTS module 170 may control the input device 120 (or the communication unit) to transmit the message and the information related to a generation situation of the message to the AI processor included in the 5G network. In addition, the TTS module 170 may control the input device 120 or the communication unit to receive AI processed information from the AI processor.

The AI processed information may be information related to an output pattern for outputting the message.

On the other hand, the speech providing apparatus 10 may perform an initial connection procedure with the 5G network in order to transmit the message and the information related to a generation situation of the message to the 5G network. The speech providing apparatus 10 may perform the initial connection procedure with the 5G network based on a synchronization signal block (SSB).

In addition, the speech providing apparatus 10 may receive, from the network, downlink control information (DCI) used for scheduling transmission of the message and the information related to a situation at the time of creation of the message obtained from the input device 120 provided inside the speech providing apparatus through the wireless communication unit.

The processor 170 may transmit the message and the information related to a situation at the time of creation of the message to the network based on the DCI.

The message and the information related to a generation situation of the message are transmitted to the network through a PUSCH, and the SSB and DM-RS of the PUSCH are a QCL for QCL type D.

Referring to FIG. 16, the speech providing apparatus 10 may transmit feature values extracted from the message and information related to a generation situation of the message to the 5G network (S1600).

Here, the 5G network may include an AI processor or an AI system, and the AI system of the 5G network may perform AI processing based on the received sensing information (S 1610).

The AI system may input the feature values received from the speech providing apparatus 10 to the ANN classifier (S1611).

The AI system may analyze the ANN output value (S1613), and determine the output pattern from the ANN output value (S1615).

The 5G network may transmit the output pattern determined by the AI system to the speech providing apparatus 10 through the wireless communication unit (S1620).

Figure 17:
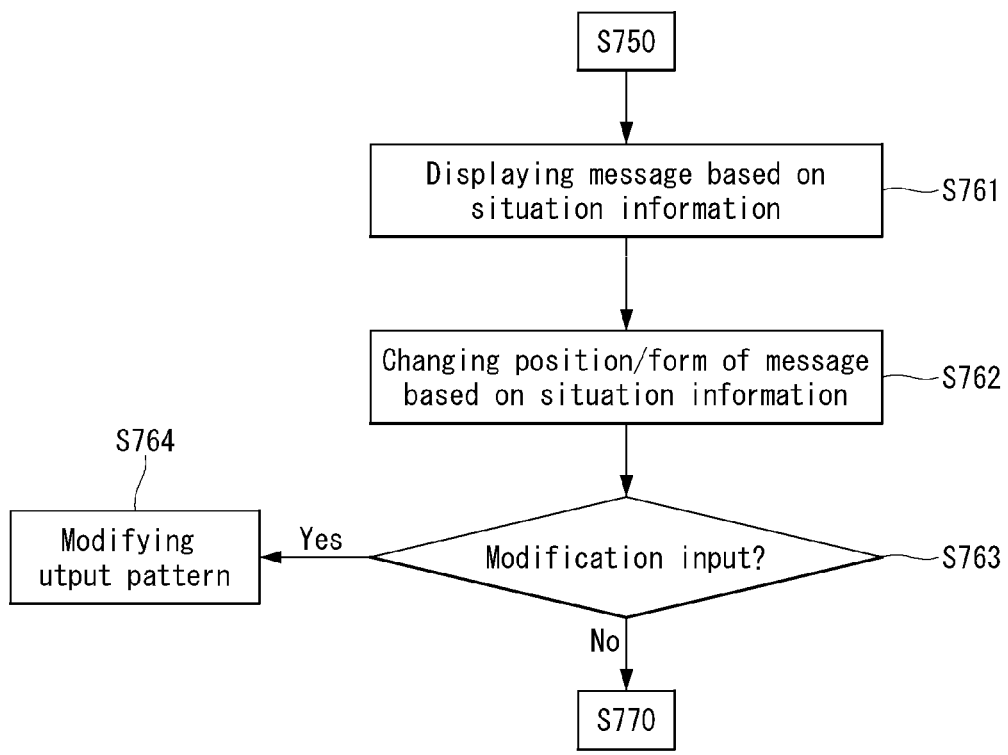
FIG. 17 is a flowchart of a process of forming an output pattern on a display.

FIG. 17 is a flowchart of a process of forming an output pattern on a display.

As shown in FIG. 17, after performing step S750 of FIG. 7, the speech providing apparatus 10 may display (indicate) a message on a display (for example, the output device 130) based on situation information (S761).

Next, the speech providing apparatus 10 may change the position/form in which the message is displayed based on the situation information (S762).

Next, the speech providing apparatus 10 may determine whether a modification input through the display is received from the user (S763).

As a result of the determination, when the modification input is received, the speech providing apparatus 10 may modify the output pattern based on the modification input of the user (S764).

As a result of the determination, when the modification input is not received (for example, when the modification input is not received within a preset threshold time), the speech providing apparatus 10 may provide the speech through the step S770 of FIG. 7.

Figure 18:
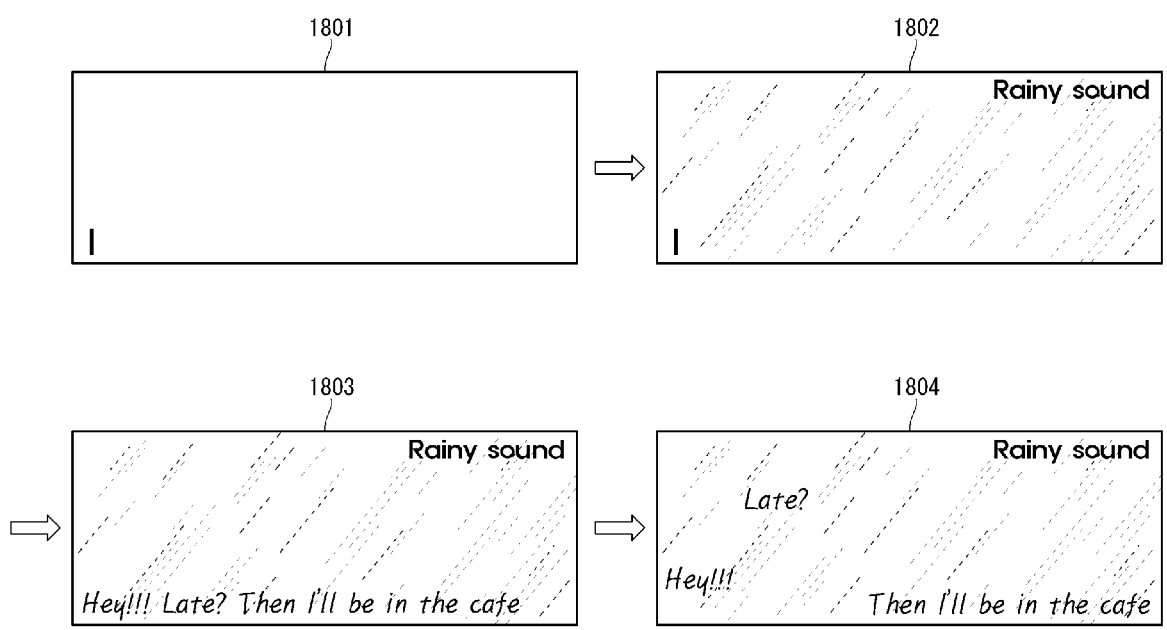
FIG. 18 illustrates a process of forming an output pattern on a display.

FIG. 18 illustrates a process of forming an output pattern on a display.

As shown in FIG. 18, the speech providing apparatus 10 may display a message display window 1801 through a display. In addition, the speech providing apparatus 10 may display a text ("listening to BGM") indicating that a sound of a surrounding environment is being sensed in the message display window 1801.

Then, after the sound of the surrounding environment is sensed and if it is confirmed that it is a rainy sound, the speech providing apparatus 10 may display a rainy background image 1802.

Subsequently, the speech providing apparatus 10 may display a message in a form of text 1803 together with the rainy background image.

In addition, the speech providing apparatus 10 may display a message 1804 by shaping the output pattern. Here, the speech providing apparatus 10 may apply information related to an emotion of a creator at a time of creation of the message to a position of the message 1804 based on the output pattern. In addition, the speech providing apparatus 10 may apply the information related to the emotion of the creator at a time of creation of the message to a color of the message 1804 based on the output pattern.

Figure 19:
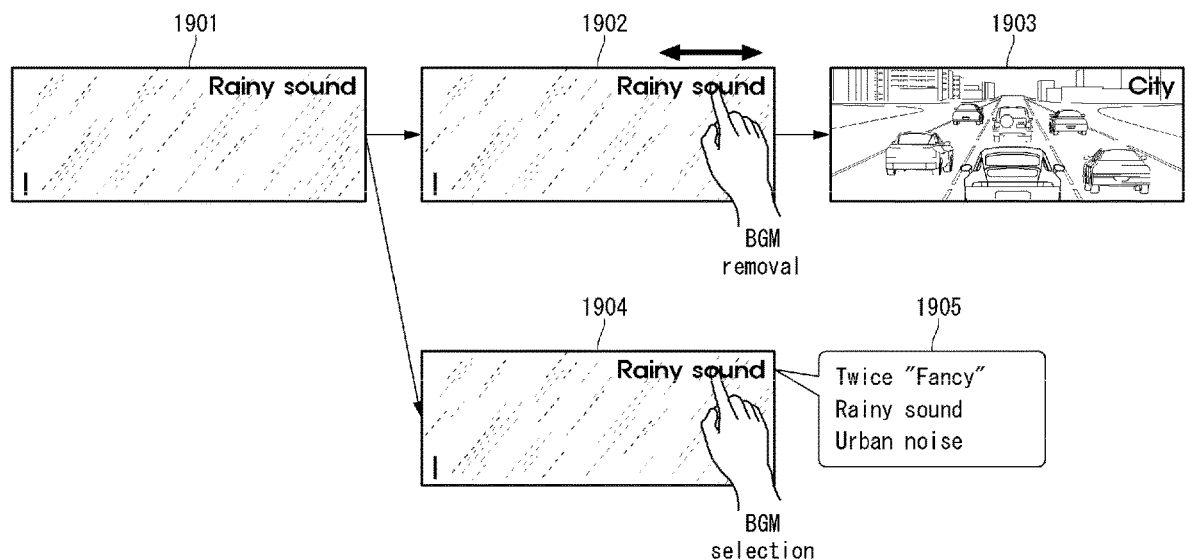
FIG. 19 illustrates one example of modifying an output pattern.

FIG. 19 illustrates one example of modifying an output pattern.

As shown in FIG. 19, the speech providing apparatus 10 may display a rainy background image 1901 on a display and simultaneously output a rainy sound through a speaker.

When a touch input is received on the "rainy sound" text portion of a background image 1902, the speech providing apparatus 10 may not output the rainy sound through the speaker while removing the rainy sound from the output pattern that outputs the rainy sound. In addition, the speech providing apparatus 10 may modify the output pattern corresponding to the touch input, while changing the background image to another image (e.g., a city image) 1903 based on the touch input.

In addition, when another touch input (e.g., a touch input over a threshold time) is received on the "rainy sound" text portion of a background image 1904, the speech providing apparatus 10 may display another candidate sound (Twice "Fancy", "Rainy Sound", "Urban Noise") list 1905, and change the background music of the output pattern in response to a selection of one of them.

Figure 20:
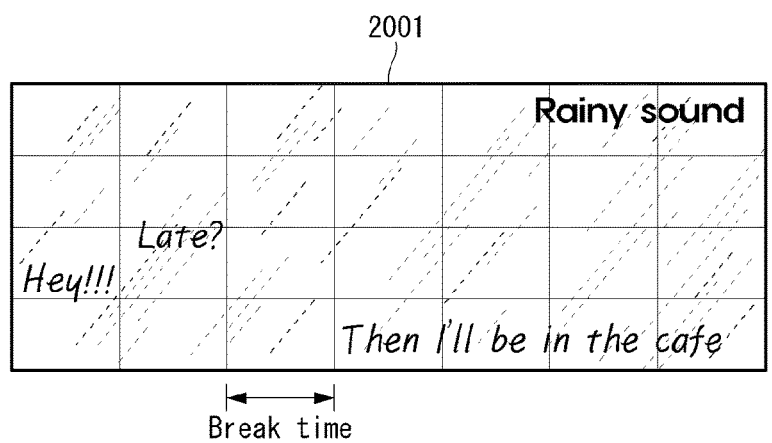
FIG. 20 illustrates an example of displaying an output pattern.

FIG. 20 illustrates an example of displaying an output pattern.

As shown in FIG. 20, the speech providing apparatus 10 may display a lattice structure indicating a time interval with a rainy background image, message 2001 on the display.

The speech providing apparatus 10 may display an output speed of the speech and a break time interval as an output pattern of the message through the lattice structure.

Figure 21:
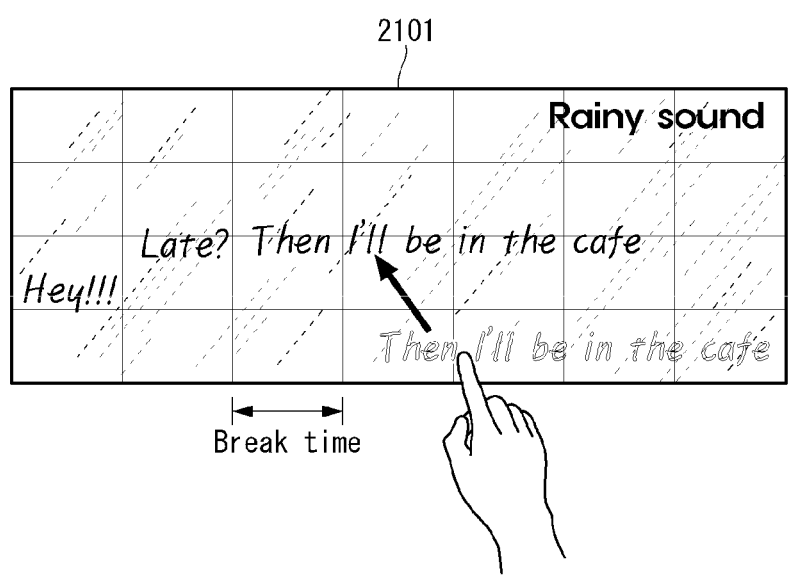
FIG. 21 illustrates another example of modifying an output pattern.

FIG. 21 illustrates another example of modifying an output pattern.

As shown in FIG. 21, the speech providing apparatus 10 may receive a drag input for some of the messages 2101 displayed by color, and change a location where some of the messages are displayed based on the drag input.

In addition, the speech providing apparatus 10 may change a display position of some of the message, and simultaneously change the output form of the speech corresponding to "Then I'll be in the cafe" as an output pattern.

A speech providing apparatus 10 of FIGS. 22 to 30 may be the same as or different from the speech providing apparatus 10 described with reference to FIGS. 7 to 21. That is, the speech providing apparatuses described with reference to FIGS. 7 to 21 may be apparatuses that create a message and generate an output pattern to provide a speech, and the speech providing apparatuses of FIGS. 22 to 30 may be apparatuses that provide a speech by receiving a message and deriving an output pattern.

Figure 22:
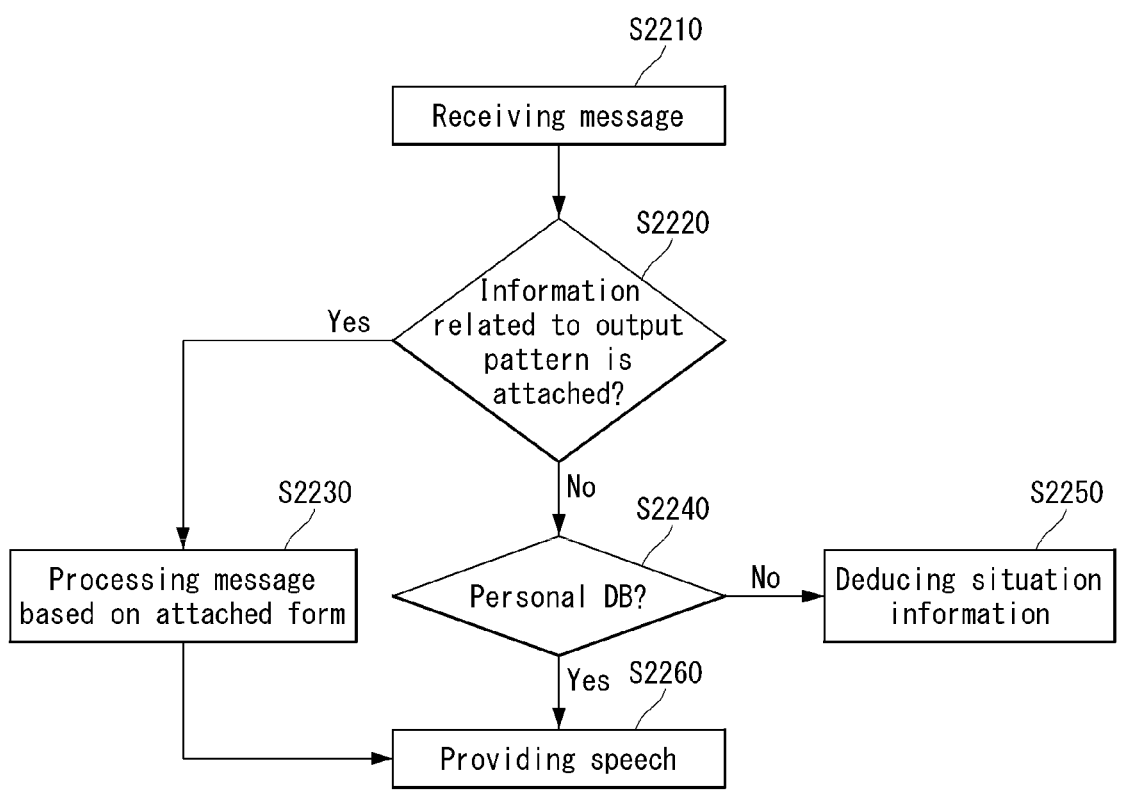
FIG. 22 is a flowchart illustrating a method for providing a speech according to another embodiment of the present invention.

FIG. 22 is a flowchart illustrating a method for providing a speech according to another embodiment of the present invention.

As shown in FIG. 22, a speech providing apparatus according to another embodiment of the present invention may provide a speech by receiving a message and deriving an output pattern through steps S2210 to S2260 of FIG. 22, and the details are as follows.

First, the speech providing apparatus may receive the message (S2210).

Then, the speech providing apparatus may determine whether information related to the output pattern is attached with the message (S2220).

As a result of the determination, if the output pattern is attached, the speech providing apparatus may process the message based on the attached form of the output pattern (S2230).

As a result of the determination, if the output pattern is not attached, the speech providing apparatus may determine whether a personal DB including output pattern information related to a creator of the message in the speech providing apparatus exists (S2240).

As a result of the determination, if the personal DB does not exist, the speech providing apparatus may deduce situation information from the message or other information and derive an output pattern based on the situation information (S2250).

As a result of the determination, if the personal DB exists, or after performing step S2250, the speech providing apparatus may provide a speech by converting the message into an output pattern stored in the personal DB (S2260).

Figure 23:
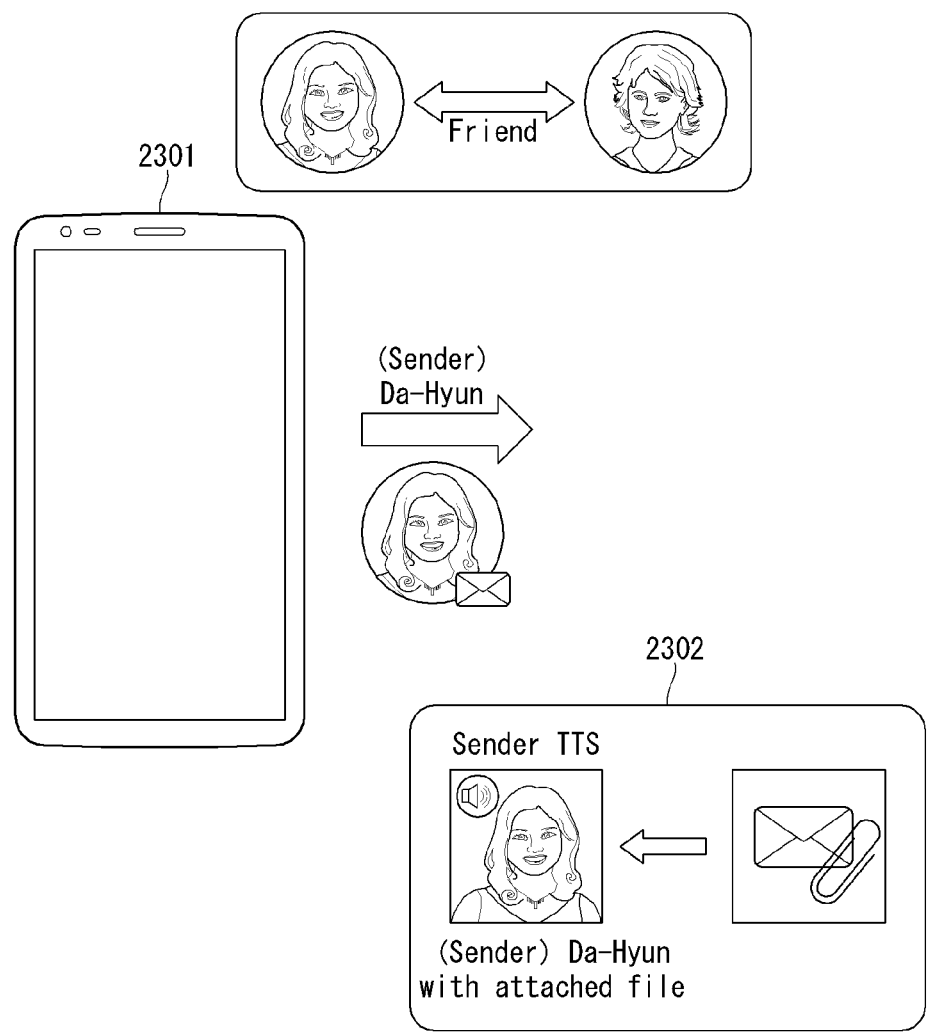
FIG. 23 illustrates an example of providing a speech using an output pattern attached with a message.

FIG. 23 illustrates an example of providing a speech using an output pattern attached with a message.

As shown in FIG. 23, a speech providing apparatus 2301 may receive a file 2302 to which a message and an output pattern are attached from a speech providing apparatus (for example, the sound providing apparatus 10) used by a sender of the message, "Da-Hyun".

In this case, the speech providing apparatus 2301 may convert the message into a speech using the output pattern and provide it.

Figure 24:
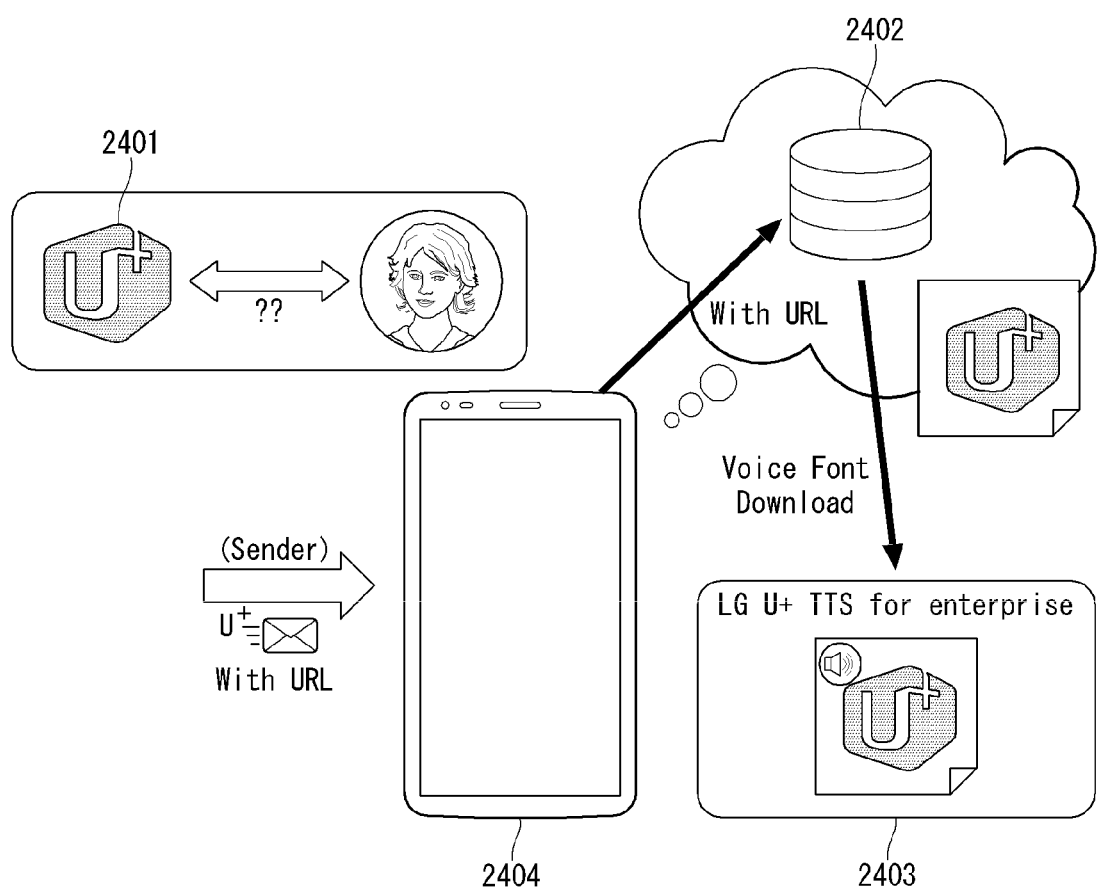
FIG. 24 illustrates an example of providing a speech using information related to a creator attached with a message.

FIG. 24 illustrates an example of providing a speech using information related to a creator attached with a message.

As shown in FIG. 24, when information (URL related to a message creator) 2401 related to a message creator, rather than an output pattern itself, is received with the message, a speech providing apparatus 2401 may access a server 2402 based on the information 2401 related to the message creator, receive an output pattern (Voice Font) related to the message creator from the server 2402, and provide a speech 2403 to which the output pattern is applied.

Figure 25:
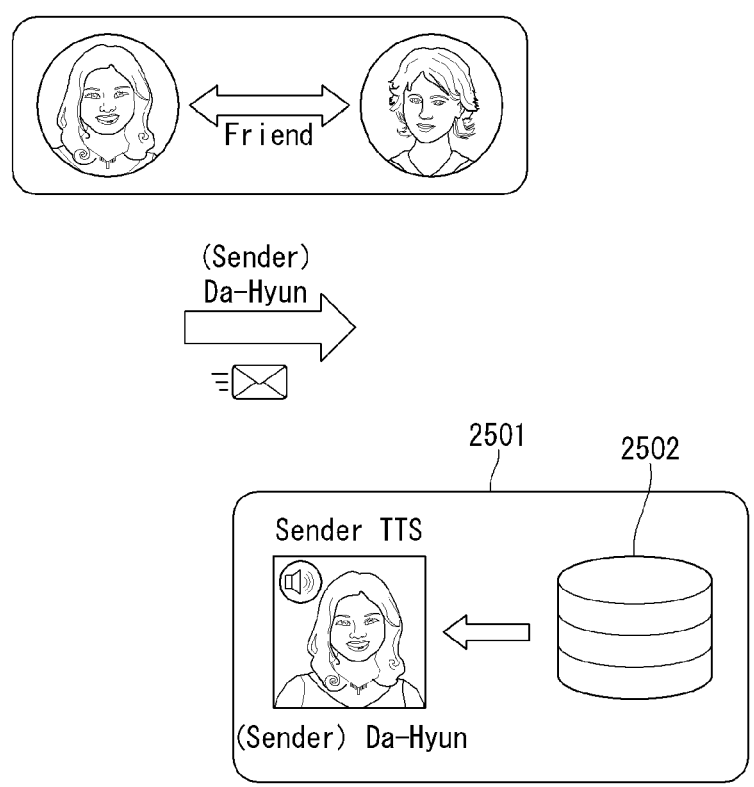
FIG. 25 illustrates an example of providing a speech based on a personal DB related to a message creator.

FIG. 25 illustrates an example of providing a speech based on a personal DB related to a message creator.

As shown in FIG. 25, a speech providing apparatus may receive a message from a message creator stored in a personal DB 2502 in the speech providing apparatus.

In this case, the speech providing apparatus may obtain an output pattern related to the message creator stored in the personal DB 2502, and convert the message into a speech 2501 with the obtained output pattern and provide it.

Figure 26:
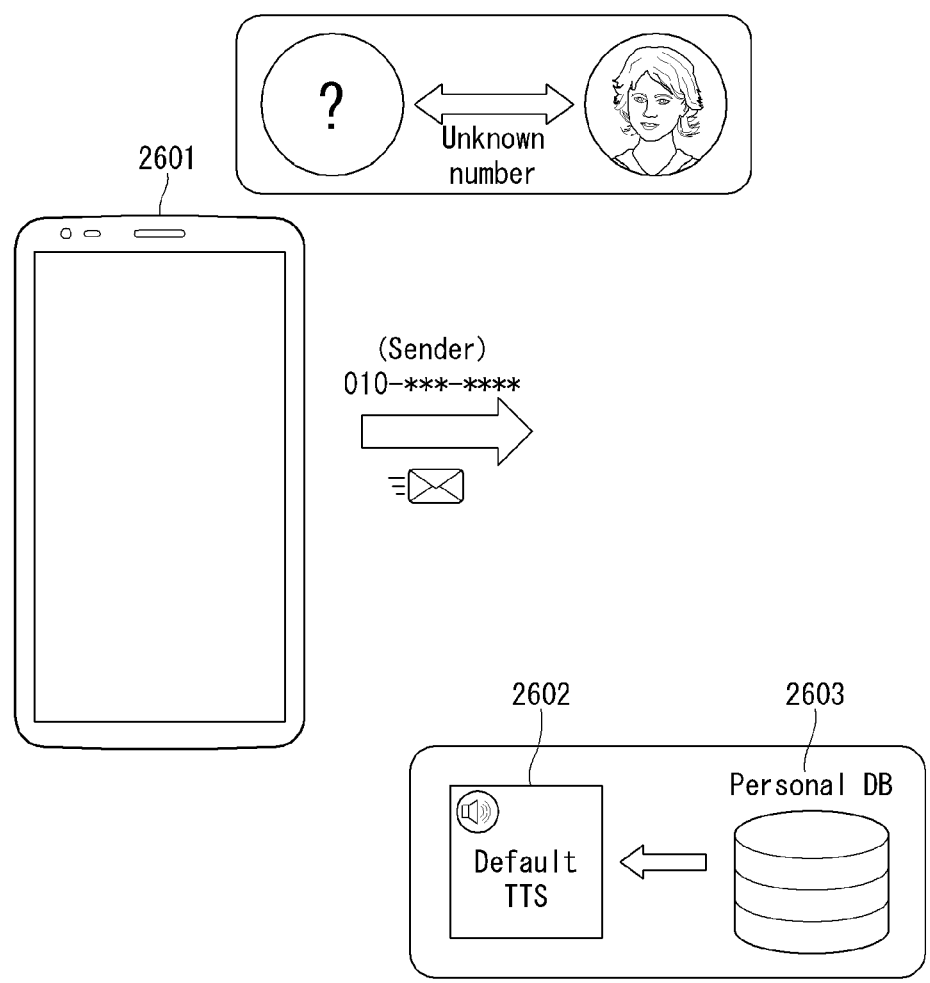
FIG. 26 illustrates an example of providing a speech with a preset TTS.

FIG. 26 illustrates an example of providing a speech with a preset TTS.

As shown in FIG. 26, a speech providing apparatus 2601 may receive a message from a sender having an unidentifiable number (unknown number).

If no output pattern is attached and a personal DB related to the sender does not also exist in the speech providing apparatus, the speech providing apparatus 2601 tries to deduce information related to the sender.

If the deduction fails, the speech providing apparatus 2601 may search the personal DB 2603 for a preset basic TTS, and provide a speech 2602 by converting the message into an output pattern corresponding to the searched basic TTS. Here, the preset basic TTS may be a TTS set (selected more than a preset number of times) to be preferred by a user of the speech providing apparatus 2601.

FIG. 27 illustrates an example of providing a speech by deducing an output pattern from a message.

As shown in FIG. 27, a speech providing apparatus 2702 may receive a message, which is "The number is not saved. I'm your brother XXX." from another speech providing apparatus 2701 having an unknown number that cannot identify a calling number.

Here, the speech providing apparatus 2702 may analyze contents of the message and deduce information related to a message creator such as sex, age, and nationality of the message creator. For example, from the message content "The number is not saved. I'm your brother XXX", the speech providing apparatus 2702 may deduce that the message creator is a male, a senior (5 to 10 years old), and from Korea.

Subsequently, the speech providing apparatus 2702 may modify 2704 a preset basic TTS (Default TTS) 2705 obtained from a personal DB 2706 using the deduced information related to the message creator, and generate a new speech 2703 of a new output pattern.

FIG. 28 illustrates an example of situation information related to a deduced message.

As shown in FIG. 28, a speech providing apparatus may deduce situation information (speaker) related to a message from the message, and derive an output pattern (text sensitivity) based on the message and the situation information.

For example, the speech providing apparatus may classify sex, age, and nationality of a message creator as the situation information (speaker) related to the message into "Default", "My friend Da-Hyun", "LG U+(Enterprise)", "Not known 1", "Not known 2-some known" by analyzing the message of any one of FIGS. 23 to 27, and deduce (sex: female or male/age: 20,?, 30, mid-20s/nationality: Korea) them item by item.

Then, the speech providing apparatus may classify an utterance speed, a pitch of the entire sentence, a relative height in sentences, emotion, and a background music (BGM) as an output pattern (text sensitivity) into "Default", "My friend Da-Hyun", "LG U+(Enterprise)", "Not known 1", "Not known 2-some known" by using the deduced situation information related to the message and message, and derive (the utterance speed: normal, fast, slow/the pitch of the entire sentence: normal, low/the relative height in sentences: less/emotion: normal, urgent, sleepy, playful/BGM: none, car engine sound) them item by item.

Figure 29:
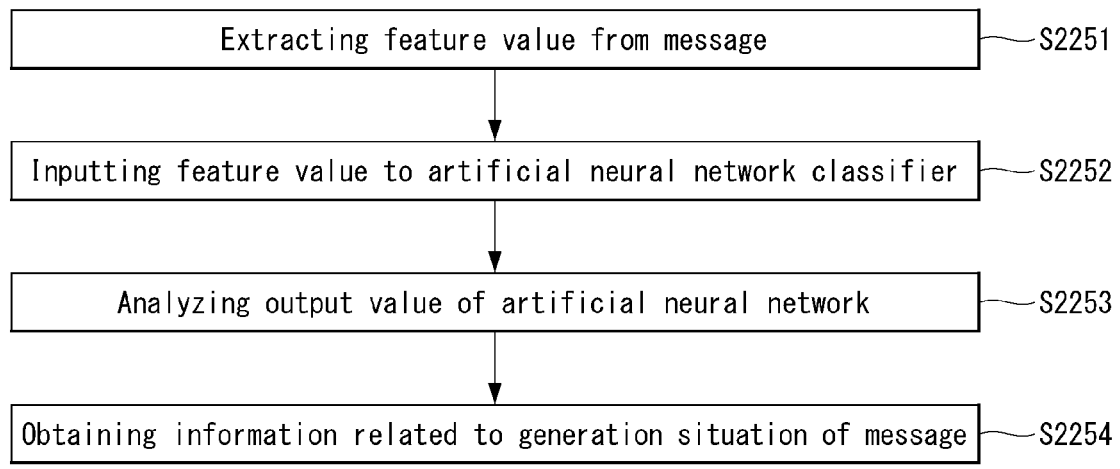
FIG. 29 is a flowchart of an example of deducing information related to a generation situation of a message from a message using an artificial neural network.

FIG. 29 is a flowchart of an example of deducing information related to a generation situation of the message from a message using an artificial neural network.

As shown in FIG. 29, a speech providing apparatus may extract a feature value from a received message (S2251).

Then, the speech providing apparatus may input the feature value to a pre-learned artificial neural network classifier stored in an AI processor in the speech providing apparatus (S2252).

Next, the speech providing apparatus may analyze an output value of an artificial neural network (S2253).

Finally, the speech providing apparatus may obtain information related to a generation situation of the message from the output value of the artificial neural network (S2254).

Figure 30:
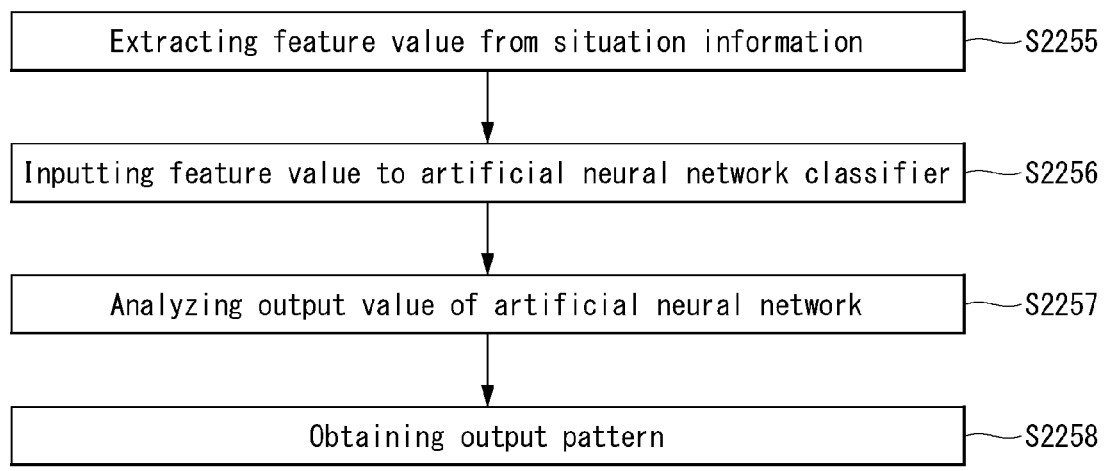
FIG. 30 is a flowchart of an example of deducing an output pattern from situation information using an artificial neural network.

FIG. 30 is a flowchart of an example of deducing an output pattern from situation information using an artificial neural network.

As shown in FIG. 30, a speech providing apparatus may extract a feature value from deduced situation information (S2255).

Then, the speech providing apparatus may input the feature value to a pre-learned artificial neural network classifier stored in an AI processor in the speech providing apparatus (S2256).

Next, the speech providing apparatus may analyze an output value of an artificial neural network (S2257).

Finally, the speech providing apparatus may obtain an output pattern from the output value of the artificial neural network (S2258).

Embodiment 1

A method for providing speech by an intelligent speech providing apparatus, comprising: obtaining a message; converting the message into a speech; and providing the speech, wherein the converting the message into a speech includes: generating output pattern information based on information related to a generation situation of the message, and converting the message into a speech based on the output pattern information.

Embodiment 2

The method of embodiment 1, wherein the information related to a generation situation of the message includes information related to a creator of the message.

Embodiment 3

The method of embodiment 2, wherein the information related to a generation situation of the message includes information related to a surrounding environment at a time the message is created.

Embodiment 4

The method of embodiment 3, wherein the information related to a generation situation of the message includes information related to a receiver of the message.

Embodiment 5

The method of embodiment 1, further comprising: displaying the message on a display based on the information related to a generation situation of the message.

Embodiment 6

The method of embodiment 5, wherein the displaying includes displaying a background image on a background of the message based on information related to a time at which the message is created or weather at a time at which the message is created.

Embodiment 7

The method of embodiment 5, wherein the displaying includes adjusting a position of the message based on information related to an emotion of a creator at a time of creation of the message.

Embodiment 8

The method of embodiment 5, wherein the displaying includes: when the message is obtained using a speech signal, adjusting a distance between a plurality of syllables included in the message based on a time-domain waveform of the speech signal.

Embodiment 9

The method of embodiment 5, further comprising: receiving a touch input to the displayed message, and modifying the generated output pattern information based on the touch input.

Embodiment 10

The method of embodiment 5, further comprising: outputting background music through an output device based on information related to a surrounding environment at a time the message is created.

Embodiment 11

The method of embodiment 1, wherein the generating output pattern information includes obtaining the output pattern information as output of a pre-learned artificial neural network by inputting the message and the information related to a generation situation of the message to the artificial neural network.

Embodiment 12

The method of embodiment 11, wherein the artificial neural network is pre-learned by using information related to a plurality of speakers and call speech data between the plurality of speakers before the obtaining the message.

Embodiment 13

The method of embodiment 12, wherein the generating output pattern information further includes classifying a plurality of speeches uttered by the plurality of speakers included in the message using the artificial neural network.

Embodiment 14

The method of embodiment 1, further comprising: receiving, from a network, downlink control information (DCI) used for scheduling transmission of the information related to a generation situation of the message obtained from at least one sensor included in the speech providing apparatus, and wherein the information related to a generation situation of the message is transmitted to the network based on the DCI.

Embodiment 15

The method of embodiment 14, further comprising: performing an initial connection procedure with the network based on a synchronization signal block (SSB), and wherein the information related to a generation situation of the message is transmitted to the network through a PUSCH, and wherein the SSB and DM-RS of the PUSCH are a QCL for QCL type D.

Embodiment 16

The method of embodiment 14, further comprising: controlling a communication unit to transmit the information related to a generation situation of the message to an AI processor included in the network; and controlling the communication unit to receive AI processed information from the AI processor, wherein the AI processed information includes the output pattern information generated based on the information related to a generation situation of the message.

Embodiment 17

An intelligent computing device controlling a speech providing apparatus, comprising: a communication unit configured to obtain a message; a processor; and a memory including a command executable by the processor, wherein the command is configured to: obtain information related to a generation situation of the message from the message; generate output pattern information based on the information related to a generation situation of the message, and output the message to a speech based on the output pattern information.

Embodiment 18

The intelligent computing device of embodiment 17, wherein the processor applies a pre-stored user preference output pattern to the message, and updates the output pattern applied to the message based on the information related to a generation situation of the message.

Embodiment 19

The intelligent computing device of embodiment 18, wherein the processor obtains the information related to a generation situation of the message by inputting the message to a pre-learned first artificial neural network, and obtains the output pattern information by inputting the information related to a generation situation of the message to a pre-learned second artificial neural network.

Embodiment 20

A non-transitory computer readable recording medium stored with a computer-executable component configured to execute on one or more processors of a computing device, the computer-executable component is configured to: obtain a message; generate output pattern information based on information related to a generation situation of the message; convert the message into a speech based on the output pattern information; and control a speech providing apparatus characterized in providing the speech.

The above-described present invention can be implemented as a computer-readable code on a medium on which a program is recorded. The computer readable medium includes all kinds of recording devices in which data that can be read by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like, or be implemented in the form of a carrier wave (e.g., transmission over the internet). Accordingly, the above detailed description should not be construed in all aspects as limiting, and be considered illustrative. The scope of the present invention should be determined by rational interpretation of the appended claims, and all changes within the equivalent range of the present invention are included in the scope of the present invention.

The effects of the intelligent speech providing method, speech providing apparatus and intelligent computing device according to an embodiment of the present invention are as follows.

The present invention can more realistically convey the situation at the time of message generation to the receiver of the TTS.

Effects which can be achieved by the present invention are not limited to the above-mentioned effects. That is, other objects that are not mentioned may be obviously understood by those skilled in the art to which the present invention pertains from the following description.

What is claimed is:

1. A method for providing a speech by an intelligent speech providing apparatus, the method comprising:
    obtaining a message;
    receiving, from a network, downlink control information (DCI) used for scheduling transmission of information related to a generation situation of the message obtained from at least one sensor included in the intelligent speech providing apparatus;
    converting the message into a speech; and
    providing the speech,
    wherein the converting the message into a speech includes:
        generating output pattern information based on the information related to the generation situation of the message, and
        converting the message into a speech based on the output pattern information,
    wherein the information related to the generation situation of the message is transmitted to the network based on the DCI.

2. The method of claim 1, wherein the information related to the generation situation of the message includes information related to a creator of the message.

3. The method of claim 2, wherein the information related to the generation situation of the message includes information related to a surrounding environment at a time the message is created.

4. The method of claim 3, wherein the information related to the generation situation of the message includes information related to a receiver of the message.

5. The method of claim 1, further comprising:
    displaying the message on a display based on the information related to the generation situation of the message.

6. The method of claim 5, wherein the displaying includes displaying a background image on a background of the message based on information related to a time at which the message is created or weather at a time at which the message is created.

7. The method of claim 5, wherein the displaying includes adjusting a position of the message based on information related to an emotion of a creator at a time of creation of the message.

8. The method of claim 5, wherein the displaying includes:
    when the message is obtained using a speech signal, adjusting a distance between a plurality of syllables included in the message based on a time-domain waveform of the speech signal.

9. The method of claim 5, further comprising:
    receiving a touch input to the displayed message; and
    modifying the generated output pattern information based on the touch input.

10. The method of claim 5, further comprising:
    outputting background music through an output device based on information related to a surrounding environment at a time the message is created.

11. The method of claim 1, wherein the generating the output pattern information includes:
    obtaining the output pattern information as output of a pre-learned artificial neural network by inputting the message and the information related to the generation situation of the message to the artificial neural network.

12. The method of claim 11, wherein the artificial neural network is pre-learned by using information related to a plurality of speakers and call speech data between the plurality of speakers before the obtaining the message.

13. The method of claim 12, wherein the generating the output pattern information further includes classifying a plurality of speeches uttered by the plurality of speakers included in the message using the artificial neural network.

14. The method of claim 1, further comprising:
    performing an initial connection procedure with the network based on a synchronization signal block (SSB), and
    wherein the information related to the generation situation of the message is transmitted to the network through a physical uplink shared channel (PUSCH), and wherein the SSB and a demodulation reference signal (DM-RS) of the PUSCH are quasi co-located(QCL) for QCL type D.

15. The method of claim 1, further comprising:
controlling a communication unit to transmit the information related to the generation situation of the message to an artificial intelligence (AI) processor included in the network; and
controlling the communication unit to receive AI processed information from the AI processor,
wherein the AI processed information includes the output pattern information generated based on the information related to the generation situation of the message.

16. An intelligent computing device for controlling a speech providing apparatus, the intelligent computing device comprising:
a communication unit configured to obtain a message;
a processor; and
a memory including at least one command executable by the processor,
wherein the processor is configured to:
obtain information related to a generation situation of the message from the message,
receive, from a network, downlink control information (DCI) used for scheduling transmission of the information related to the generation situation of the message,
generate output pattern information based on the information related to the generation situation of the message, and
output the message to a speech based on the output pattern information,
wherein the information related to the generation situation of the message is transmitted to the network based on the DCI.

17. The intelligent computing device of claim 16, wherein the processor applies a pre-stored user preference output pattern to the message, and
updates the output pattern applied to the message based on the information related to the generation situation of the message.

18. The intelligent computing device of claim 17, wherein the processor obtains the information related to the generation situation of the message by inputting the message to a pre-learned first artificial neural network, and
obtains the output pattern information by inputting the information related to the generation situation of the message to a pre-learned second artificial neural network.

19. A non-transitory computer readable recording medium stored with a computer-executable component configured to execute on one or more processors of a computing device, the computer-executable component is configured to:
obtain a message;
receive, from a network, downlink control information (DCI) used for scheduling transmission of information related to a generation situation of the message obtained from at least one sensor included in an intelligent speech providing apparatus;
generate output pattern information based on the information related to the generation situation of the message;
convert the message into a speech based on the output pattern information; and
control a speech providing apparatus characterized in providing the speech,
wherein the information related to the generation situation of the message is transmitted to the network based on the DCI.

* * * * *